(12) United States Patent
Baudat

(10) Patent No.: US 9,319,638 B1
(45) Date of Patent: Apr. 19, 2016

(54) ON-AXIS GUIDE SYSTEM

(76) Inventor: Gaston Daniel Baudat, Glenmoore, PA (US)

(*) Notice: Subject to any disclaimer, the term of this patent is extended or adjusted under 35 U.S.C. 154(b) by 923 days.

(21) Appl. No.: 13/530,644

(22) Filed: Jun. 22, 2012

Related U.S. Application Data

(60) Provisional application No. 61/499,709, filed on Jun. 22, 2011.

(51) Int. Cl.
*H04N 7/18* (2006.01)

(52) U.S. Cl.
CPC .............. *H04N 7/181* (2013.01); *H04N 7/183* (2013.01)

(58) Field of Classification Search
CPC ........... G02B 17/0631; G02B 17/0663; H04N 5/332; H04N 5/23296
See application file for complete search history.

(56) References Cited

U.S. PATENT DOCUMENTS

| | | | |
|---|---|---|---|
| 5,525,793 A | 6/1996 | Holmes et al. | |
| 6,678,047 B1* | 1/2004 | Miyazaki | G01B 11/00 356/399 |
| 2004/0150899 A1* | 8/2004 | Barziza | G03B 17/48 359/822 |
| 2007/0046948 A1* | 3/2007 | Podoleanu | A61B 3/102 356/497 |
| 2008/0208006 A1* | 8/2008 | Farr | A61B 1/0607 600/178 |

* cited by examiner

*Primary Examiner* — Andy Rao
*Assistant Examiner* — Obafemi Sosanya
(74) *Attorney, Agent, or Firm* — Steinberg Intellectual Property Law LLC; Gloria M. Steinberg, Esq.

(57) ABSTRACT

An on-axis dichroic guide system provides a telescope with an automated active control and focusing system for imaging celestial bodies. The on-axis dichroic guide system mainly comprises a system body, a scope port, a guide port, an imaging port, and an dichroic beam splitter. The scope port is positioned adjacent to the system body, and the guide port is positioned adjacent to the system body opposite to the scope port. The imaging port is positioned adjacent to the system body on an axis that is non-parallel to the axis containing the scope port and the guide port. The dichroic beam splitter is positioned with the system body. In addition, the dichroic beam splitter is arranged to reflect the visible portion of the input light towards the imaging port and to direct the infrared portion the input light towards the guide port.

13 Claims, 26 Drawing Sheets

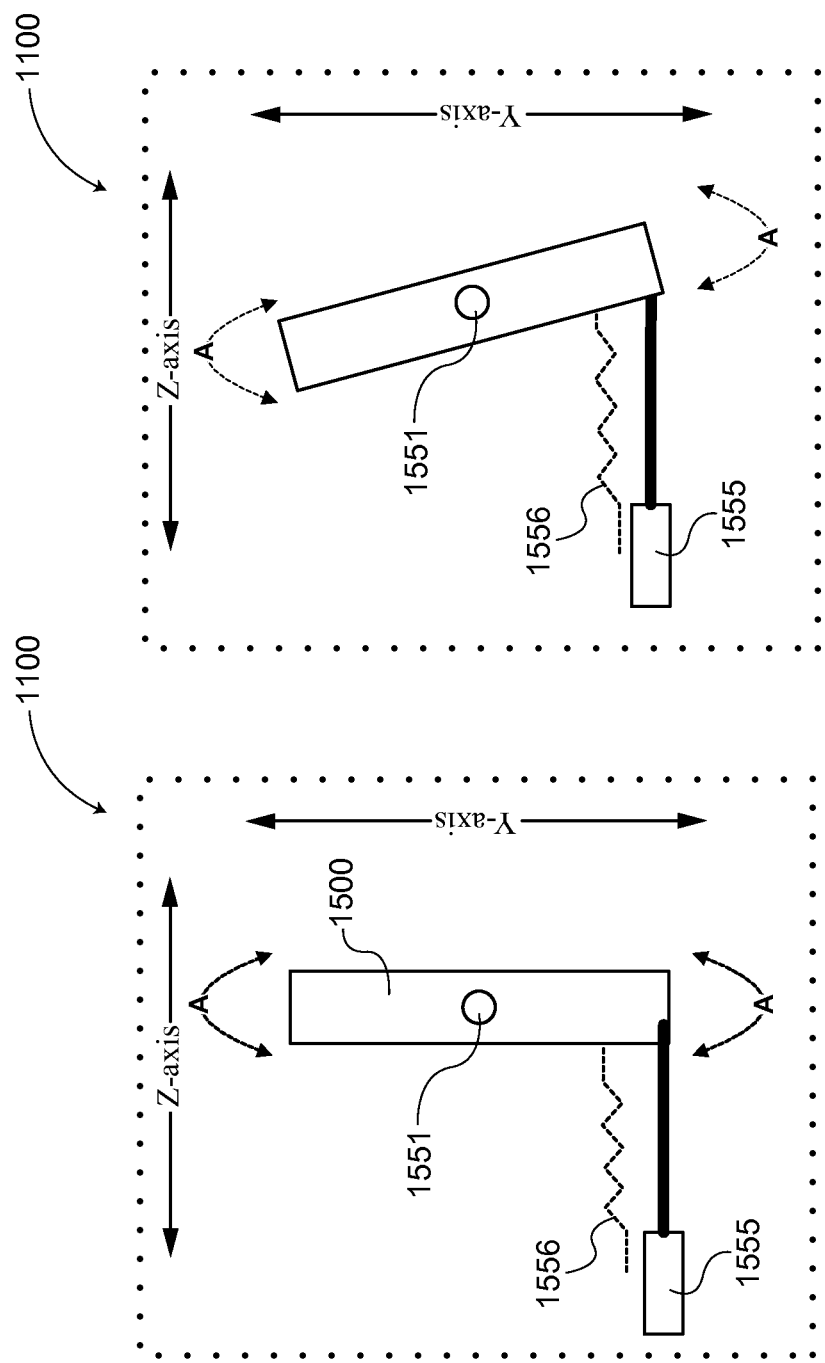

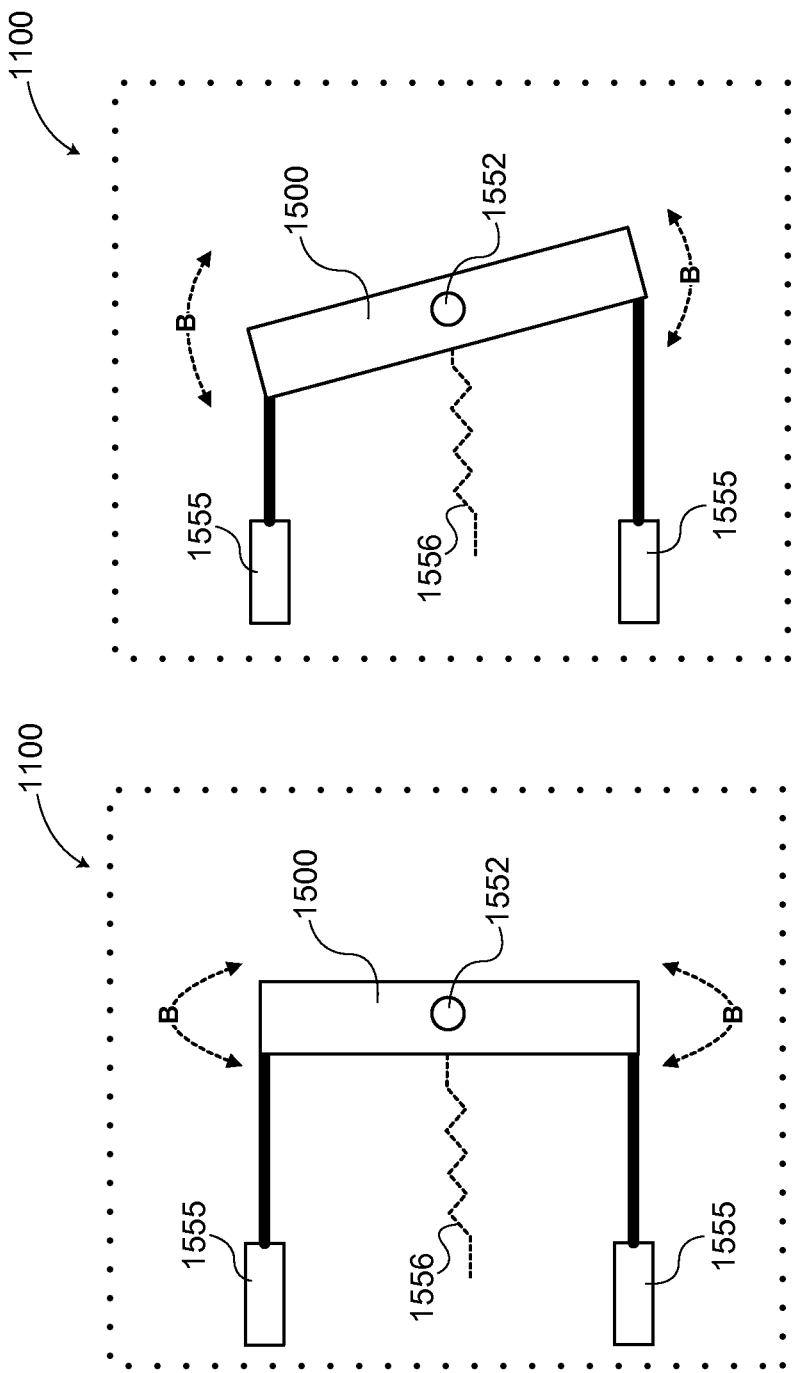

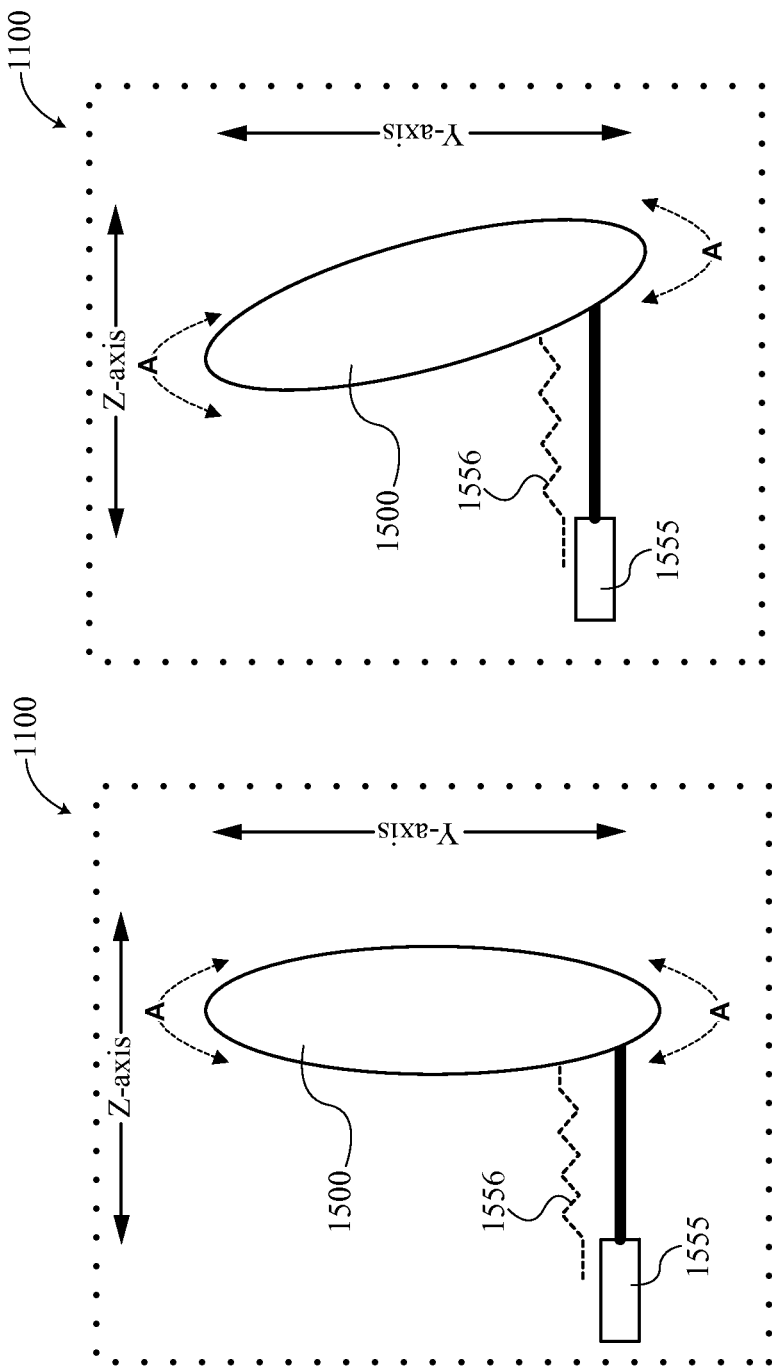

ON-AXIS GUIDE SYSTEM

The current application claims a priority to the U.S. Provisional Patent application Ser. No. 61/499,709 filed on Jun. 22, 2011.

FIELD OF THE INVENTION

The present invention relates generally to a tracking and imaging system for a telescope. In particular, the present invention relates to an automated active control and focusing system for imaging celestial bodies.

BACKGROUND OF THE INVENTION

The capturing of astronomical images by using long exposure image capture techniques has long been known in the arts. When used in a telescope configuration, an imaging device such as a film camera or digital camera is mounted to a telescope having a defined field of view. The field of view used to capture an astronomical image is generally defined by the size and optics of a given telescope including the viewing aperture in the telescope body.

Due primarily to the rotation of the earth relative to the star or celestial body desired to be imaged, there has been development of various guide star tracking techniques. In a simple telescope configuration, a second guide scope is mounted in parallel with the main scope in order to locate a guide star within a portion or near the field of view of the main scope used for imaging. In more sophisticated configurations, a guide sensor is rigidly mounted off-axis within the housing body of the main scope. In such configurations, an imaging sensor (e.g. a charged-coupled device (CCD) sensor) is mounted near the center of the housing at a distal end opposite the opening aperture of the housing. In addition, there is a reflective member rigidly mounted (e.g. at a 45 degree angle) but adjacent to the imaging sensor. The reflective member directs light toward a second sensor (e.g. a CCD sensor) used for tracking a guiding object (e.g. a guide star). This configuration allows the guiding image to view a tracking star just outside of the field of view of the imaging sensor. Such a configuration allows for tracking a guide star in the periphery of the imaging sensor field of view (i.e. off-axis guiding) and is disclosed in issued U.S. Pat. No. 5,525,793.

One disadvantage of prior art devices is that the accessible field of view is quite limited. Such a drawback makes it difficult to locate a guide start bright enough, thus making finding a usable guide star challenging and time consuming. When using a second scope for guiding, there is an ability to have a larger field of view, however mirror motions and mechanical flexure differences between the guide scope and the main scope result in limits for medium and short imaging exposures.

SUMMARY OF INVENTION

The present invention relates to an on-axis dichroic guide system for capturing images of celestial bodies. In particular, the disclosure relates to an astronomical imaging system including an imaging member (e.g. a camera or sensor), and a guiding member (e.g. a CCD camera or sensor) movably mounted on-axis with the scope port aperture. Since the imaging of many astronomical objects involves the use of long exposure times, the use of an imaging member such as a CCD camera allows for the breaking down of the long exposure into a sequence of short exposures which are then aligned and stacked together using a computing device. This arrangement can be combined with a movable mounting system for the scope housing or body which can be adjusted to compensate for the movement of the earth relative to the astronomical object being imaged. To overcome the disadvantage of the error in movement of the main scope moveable mounting system and other variations, a fine tuning adjustment mechanism can be included with the imaging system. In one embodiment, an adaptive optics module can be included to compensate for the error in movement resulting from the main scope adjustment mechanism as well as other movement variations including, but not limited to, wind, vibration, or any other factor resulting in movement of the imaging system relative to the object being imaged.

In the preferred embodiment of the present invention, the on-axis dichroic guide system includes a main scope body having a scope port at one end and a guiding port at a second distal end. Mounted to the guide port can be an X-Y stage configured to moveably mount a guiding member (e.g. a CCD camera). Additionally, near the guide port and extending in a direction to the side of the main scope body is an imaging port configured for mounting an imaging member (e.g. a CCD camera).

In the preferred embodiment, an optical enhancement module is coupled to the on-axis dichroic guide system. The optical enhancement module can include an optical element operatively coupled to an adaptive optics mechanism. The adaptive optics drive mechanism is configured to orient the optical element in a tilt and tip direction. In some configurations, the optical element is a flat surfaced component having an optical power of 1. In other configurations, the optical element is a non-flat surface component having an optical power other than 1. In other embodiments, the adaptive optics drive mechanism can be further configured to move the optical element in a Z-direction to allow for the fine fast focusing the image received by the imaging member.

In the preferred embodiment, the on-axis dichroic guide system can be operatively coupled to a computing device. The computing device can be operable to provide control signals to the movable mounting system and the optical enhancement module to adjust the field of view of the imaging member. In an implementation, the computing device is operable to receive image data from the imaging member and/or the guide member. The computing member can be configured to use the image data received from the imaging member and/or the guiding member to cause the movable mount and the optical enhancement module to adjust the imaging member field of view in real time. In some configurations, the computing device can be operable to use the imaging data received from the imaging member and/or the guide member in order to adjust the field of view of the imaging member in real time, and adjust the focus of the image received by the imaging member at a time between exposure events of the imaging member.

In the preferred embodiment, a light amplification module can be coupled between the guide member and the guide body of the on-axis dichroic guide system. The light amplification module can be configured to increase the received light by the guide member. In an implementation, the light amplification module can be an image intensifying tube (IIT) or an electron multiplied charge coupled device (EMCCD) or any other type of light amplification device as known in the arts. An example of light amplification modules are those similar to an IIT as used in conventional night view optics or goggles.

In the preferred embodiment, a targeting module can be coupled to the on-axis dichroic guide system. The targeting module can be configured to provide a target object to the imaging member. The targeting object can be used by the computing device to determine the location of the field of view of the guide member, and, thus, the computing device can determine how to adjust the field of view of the guide member within the field of view of the imaging member. In an implementation, the targeting module can include a targeting source for providing targeting light of the targeting object. The targeting module can be configured to include a beam splitter for reflecting the targeting light from the source towards the dichroic beam splitter. The targeting light is reflected by the dichroic beam splitter towards a reflecting mirror located within the guide body of on-axis guide system. The reflecting mirror is arranged to reflect the targeting light toward the imaging member. Using the targeting object received by the imaging member, the computing device can provide control signals to the X-Y stage to adjust the location of the guide member field of view to an appropriate location within the field of view of the imaging member.

BRIEF DESCRIPTION OF THE DRAWINGS

FIG. 6 illustrates an adaptive optics mechanism according to an embodiment of the present invention.

FIG. 7 illustrates an orientation of an adaptive optics mechanism in a tilt direction according to an embodiment of the present invention.

FIG. 8 illustrates an orientation of an adaptive optics mechanism according to an embodiment of the present invention.

FIG. 9 illustrates an orientation of an adaptive optics mechanism in a tip direction according to an embodiment of the present invention.

FIG. 23 illustrates an adaptive optics mechanism according to an embodiment of the present invention.

FIG. 24 illustrates an orientation of an adaptive optics mechanism in a tilt direction according to an embodiment of the present invention.

DETAIL DESCRIPTIONS OF THE INVENTION

All illustrations of the drawings are for the purpose of describing selected versions of the present invention and are not intended to limit the scope of the present invention.

Figure 1:
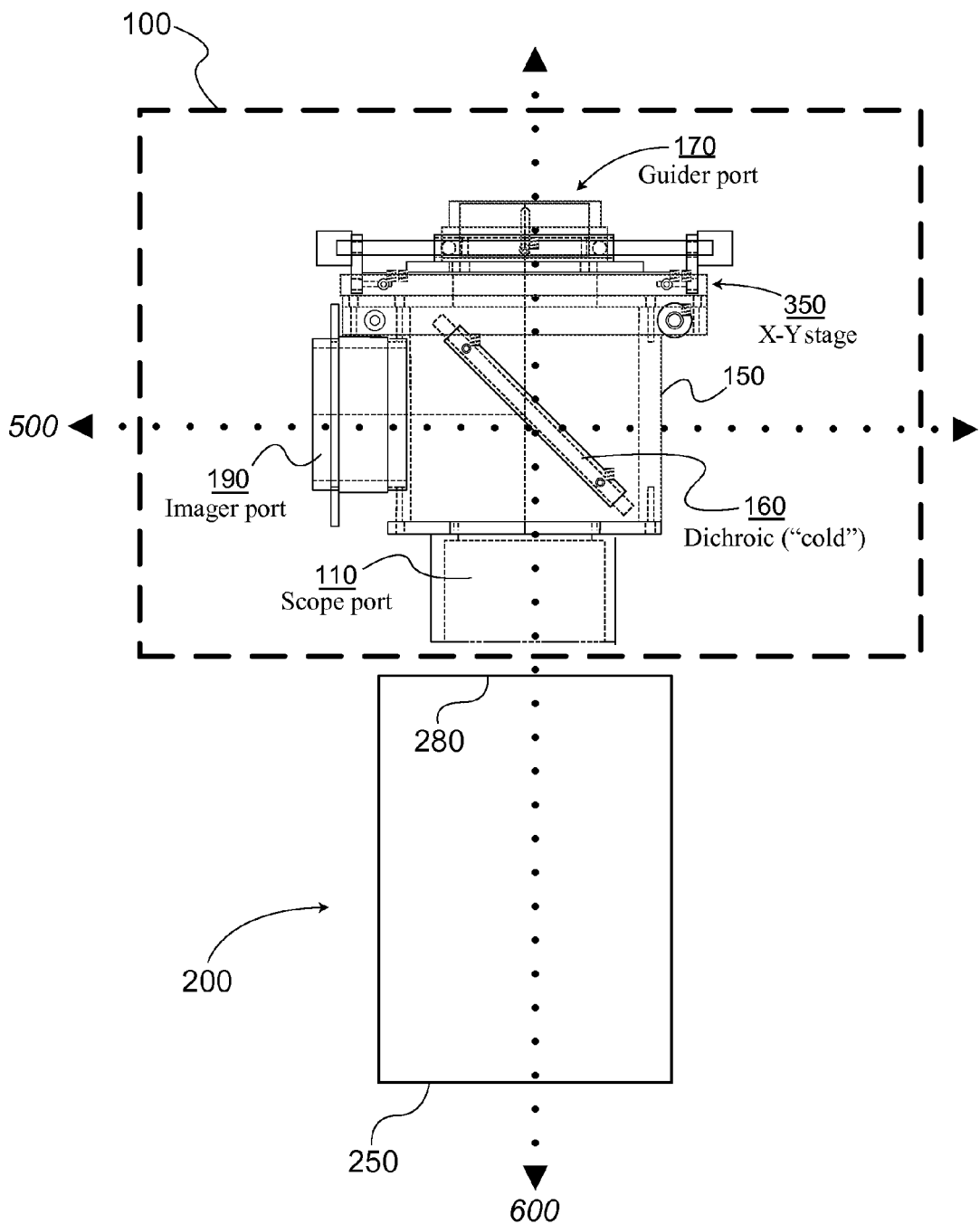
FIG. 1 illustrates an on-axis guide system operatively coupled to a main scope body according to an embodiment of the present invention.

As can be seen in FIG. 1, the present invention relates to an on-axis dichroic guide system 100 coupled to a main scope body 200 having a viewing aperture 250 and a visual back 280. Light enters the main scope body 200 at the viewing aperture 250 and travels towards the visual back 280. The on-axis dichroic guide system 100 includes a scope port 110, a system body 150, a guide port 170, and an imaging port 190. The on-axis dichroic guide system 100 can be fixedly mounted to the main scope body 200 at the visual back 280.

Figure 2:
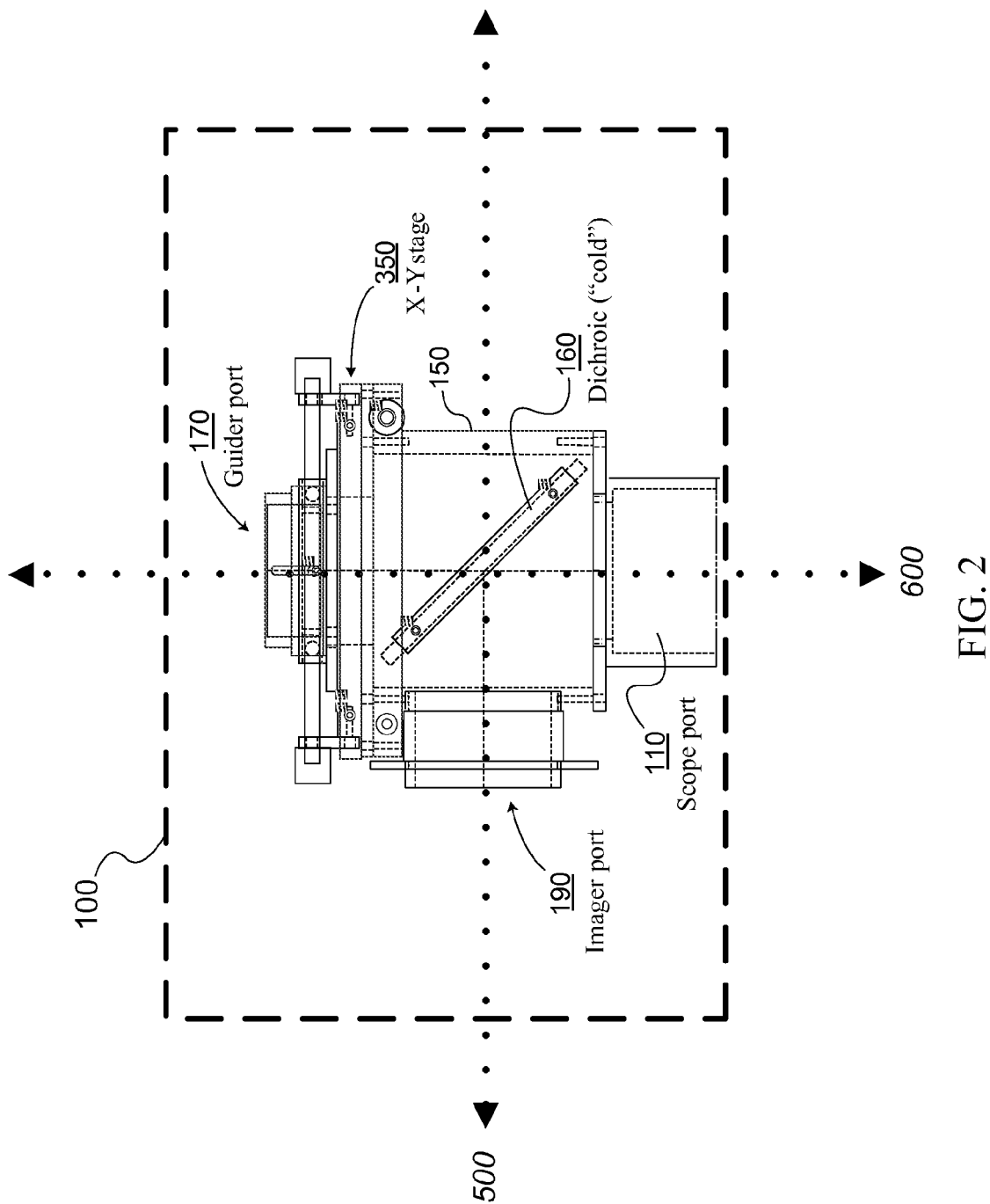
FIG. 2 illustrates an on-axis guide system according to an embodiment of the present invention.
Figure 3:
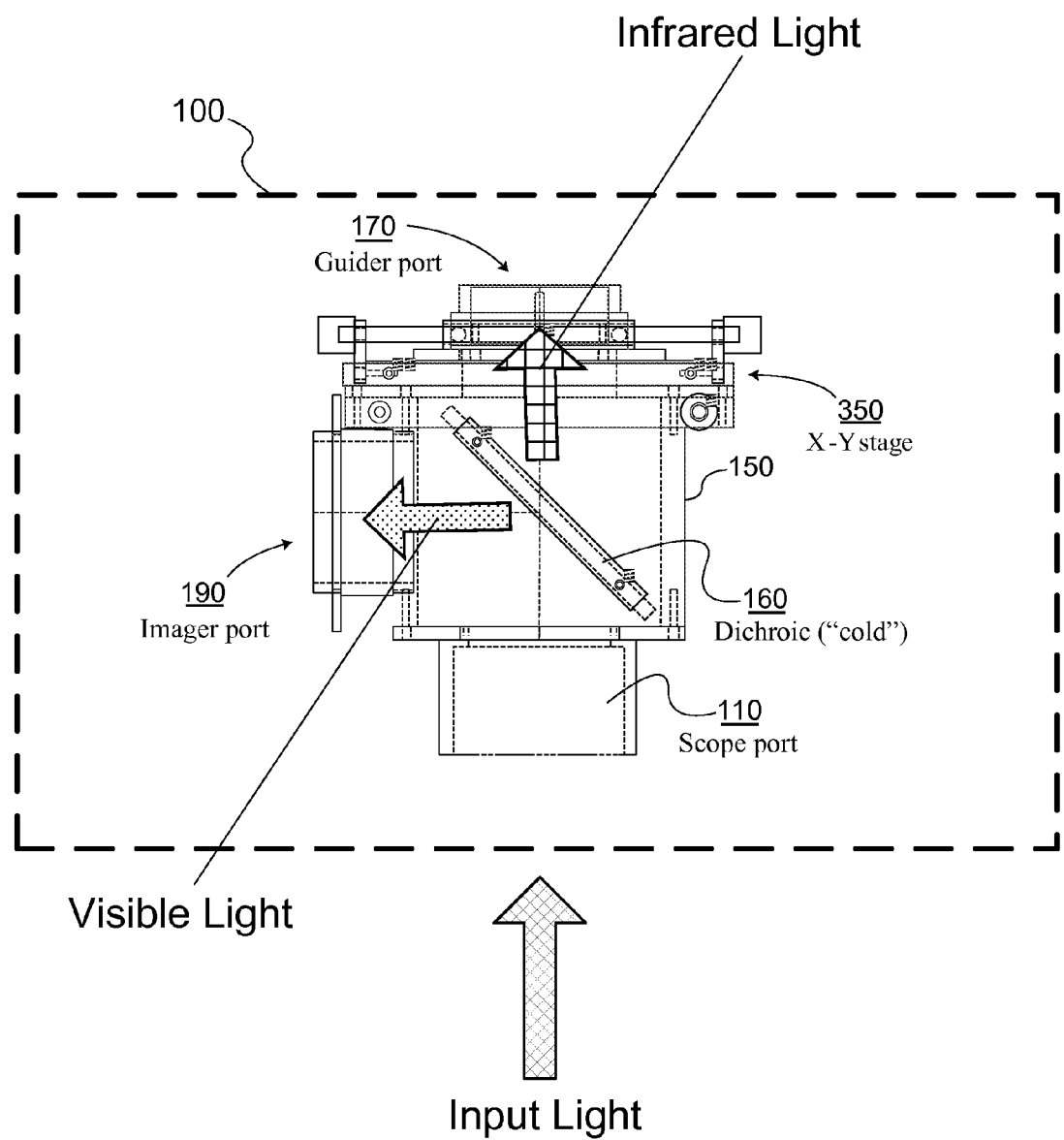
FIG. 3 illustrates the reflection of visible light by a dichroic beam splitter and the passing through of infrared light through the dichroic beam splitter according to an embodiment of the present invention.

In the preferred embodiment of the present invention, the on-axis dichroic guide system 100 is configured to include a scope port 110 that is located on a system body 150 opposite of the guide port 170 and to include an imaging port 190 that is located non-parallel to a scope axis 600 defined between the scope port 110 and the guide port 170. As can be seen in FIG. 2, mounted within the system body 150 can be an optical beam splitter 160, which is mounted at roughly a 45 degree angle relative to the scope axis 600. In the preferred embodiment, the optical beam splitter 160 can be a dichroic mirror (e.g., a cold mirror) configured to allow light in the infrared spectrum band to pass through along the scope axis 600 and towards the guide port 170, while allowing light in the visible spectrum band to be reflected along an imaging axis 500 perpendicular to scope axis 600 as shown in FIG. 2.

Figure 4:
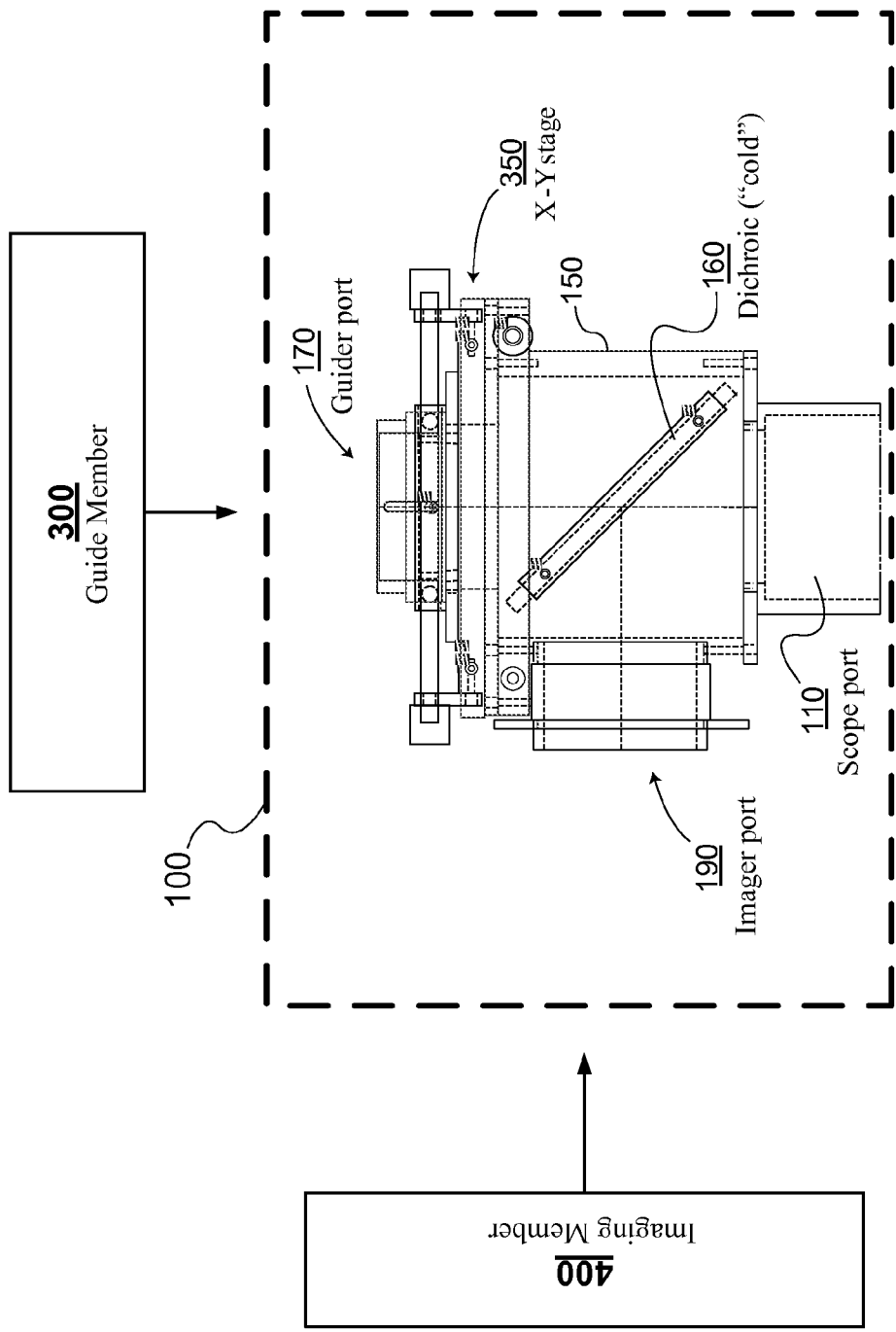
FIG. 4 illustrates an imaging member and a guide member operatively coupled to an on-axis guide system according to an embodiment of the present invention.
Figure 21:
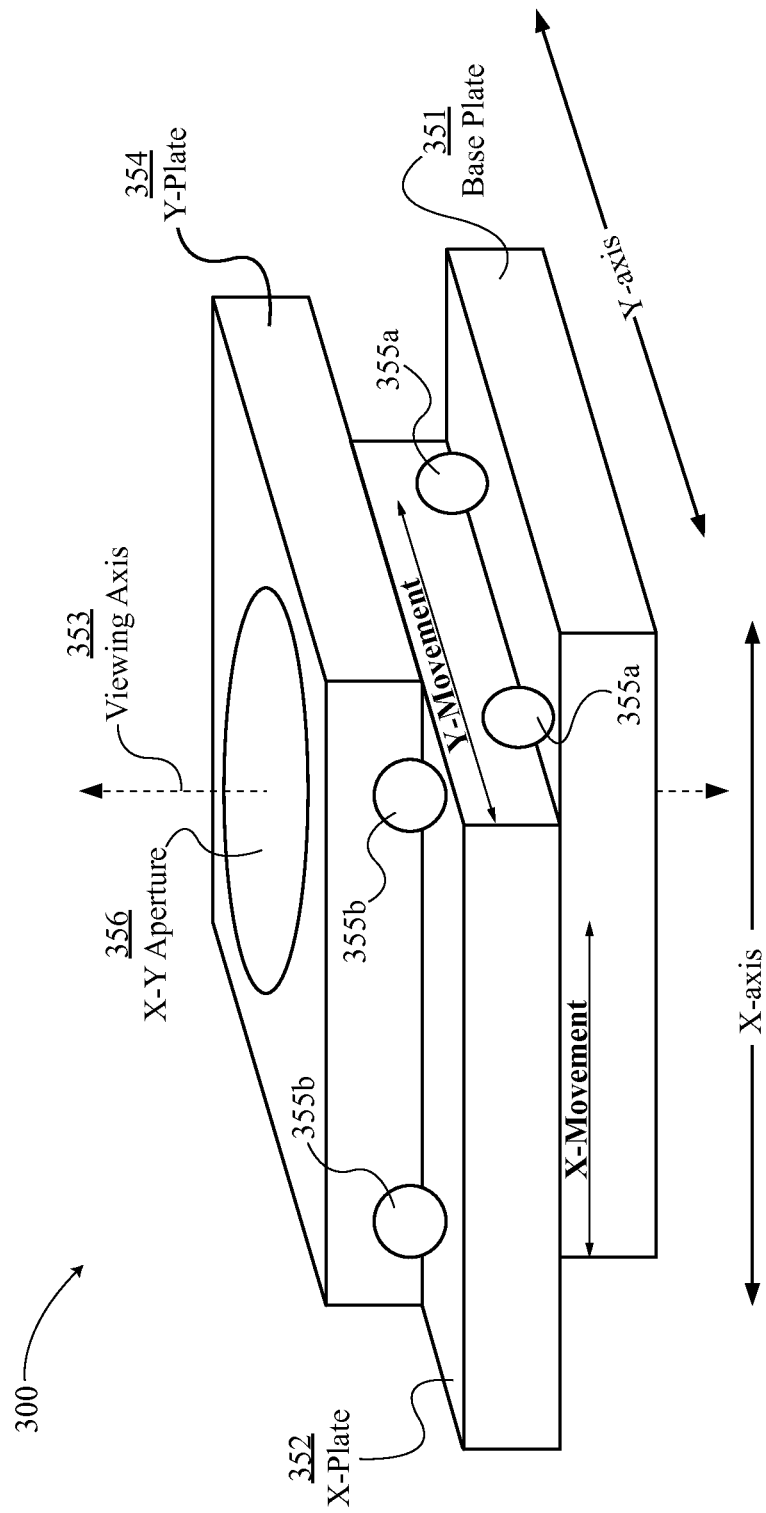
FIG. 21 illustrates an X-Y stage according to an embodiment of the present invention.

In the preferred embodiment, the guide member 300 is operatively coupled to the guide port 170 using an X-Y stage 350 as shown in FIG. 4. The X-Y stage 350 allows the guide member 300 to be movable in both the X and Y directions as shown in FIG. 21. The range of motion of the X-Y stage 350 allows the guide member 300 to be positioned within a desired portion of the field of view of the viewing aperture 250. An imaging member 400 can be coupled to an on-axis dichroic guide system 100 at the imaging port 190.

In some embodiments, the X-Y stage 350 includes an X-Y drive mechanism to allow for automated or manual adjustment of the guide member 300 within the field of view of the viewing aperture 250. In one embodiment, the X-Y drive mechanism can be configured to include a base plate 351, an X-plate 352, and a Y-plate 354, which are shown in FIG. 21. The X-Y stage 350 can further include a pair of X-adjustment members 355 operatively coupled between the base plate 351 and the X-plate 352. The X-adjustment members 355 are configured to allow the X-plate 352 to move in the X-direction (along X-axis) relative to the base plate 351. The X-Y stage 350 can include a pair of Y-adjustment members 356 operatively coupled between the X-plate 352 and the Y-plate 354. The Y-adjustment members 356 are configured to allow the Y-plate 354 to move in the Y-direction (along Y-axis) relative to the X-plate 352 and the base plate 351. The X-adjustment members 355 and the Y-adjustment members 356 can be arranged for sliding movement. In some embodiments, the X-adjustment members 355 and the Y-adjustment members 356 can be a type of screw drive system or any other mechanical arrangement allowing the X-Y stage 350 to accomplish movement between the X-plate 352, the Y-plate 354, and the base plate 351, respectively. In some implementations, the X-Y drive mechanism is a manual drive system or a powered drive system (e.g. by step motors) to adjust the positional relationships of the X-plate 352 and the Y-plate 354 relative to the base plate 351.

The X-Y-stage 350 can include a X-Y aperture 357 extending through the base plate 351, the X-plate 352, and the Y-plate 354 to allow light exiting the on-axis dichroic guide system 100 to pass through a X-Y stage viewing axis 353. The movement and operation of the X-Y stage 350 will be described in greater detail in the present invention below.

Figure 5:
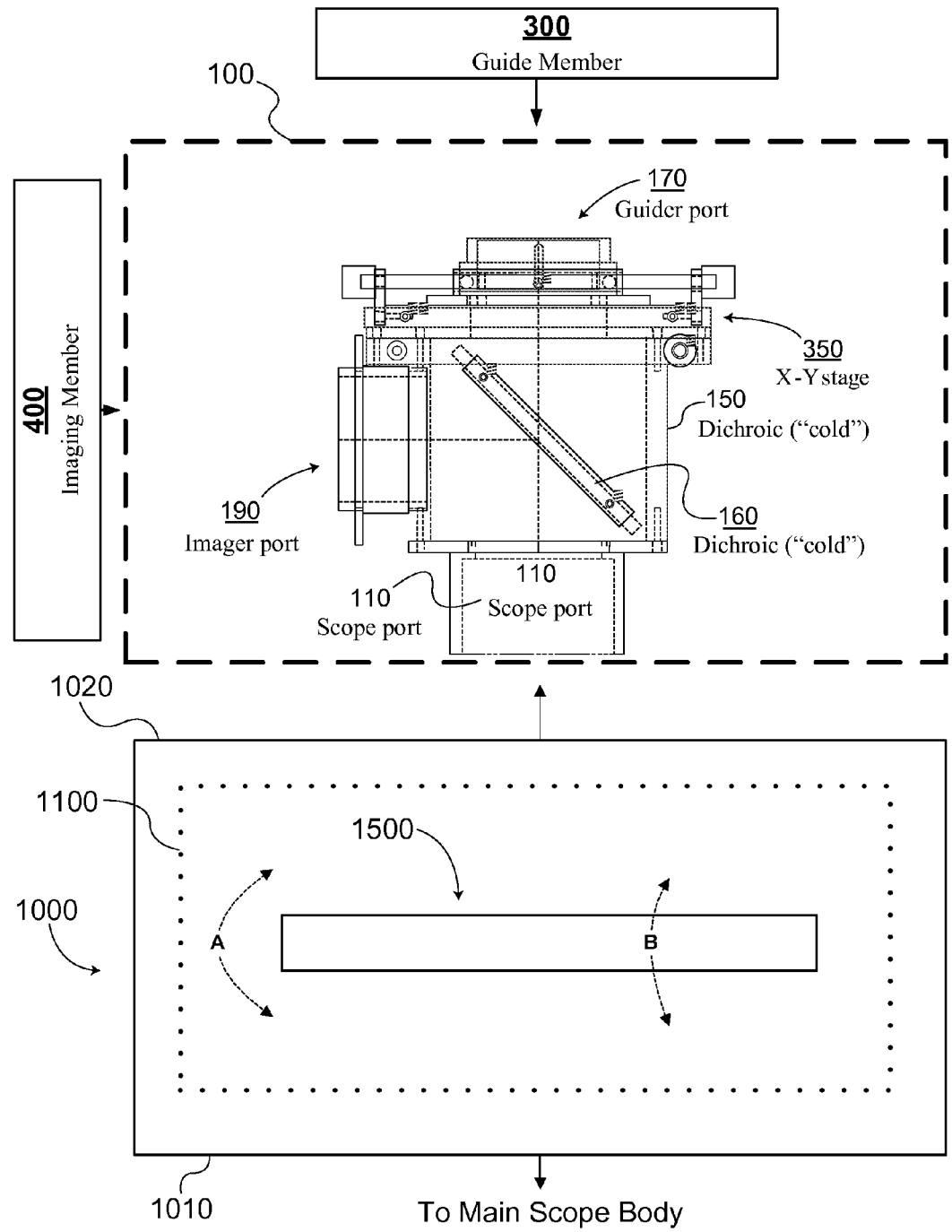
FIG. 5 illustrates optical enhancement module operatively coupled to an on-axis guide system according to an embodiment of the present invention.

In some embodiments, an optical enhancement module 1000 can be operatively coupled between the main scope body 200 and the on-axis dichroic guide system 100 as shown in FIG. 5. The optical enhancement module 1000 can further include an adaptive optics mechanism 1100 including a tilt/tip optical element 1500. In one embodiment, the tilt/tip optical element 1500 is a flat surface transparent element (e.g. a glass or window). In another embodiment, the tilt/tip optical element 1500 can be a lens arrangement having at least one non-flat surface. The tilt/tip optical element 1500 can be coupled to the adaptive optics mechanism 1100 through an adaptive optics drive system 1550 as shown in FIG. 6 through 9. In some embodiments, the adaptive optics drive system 1550 includes a pair of linear drive actuators 1555 coupled to the tilt/tip optical element 1500 and a biasing member 1556. The adaptive optics drive system 1550 provides the tilt/tip optical element 1500 to move in a tilt direction A and a tip direction B as shown in FIG. 6 through 9. Movement of the tilt/tip optical element 1500, via the adaptive optics drive system 1550, in direction A can occur about a first pivot axis 1551. Movement of the tilt/tip optical element 1500, via the adaptive optics drive system 1550, in direction B can occur about a second pivot axis 1552. In one embodiment, the adaptive optics mechanism 1100 can further include a focusing drive assembly for moving the tilt/tip optical element 1500 in a Z-direction. Light from the main scope body 200 enters the optical enhancement module 1000 at an entering side 1010, passes through the tilt/tip optical element 1500 and exits the optical enhancement module 1000 through an exit side 1020.

Figure 17:
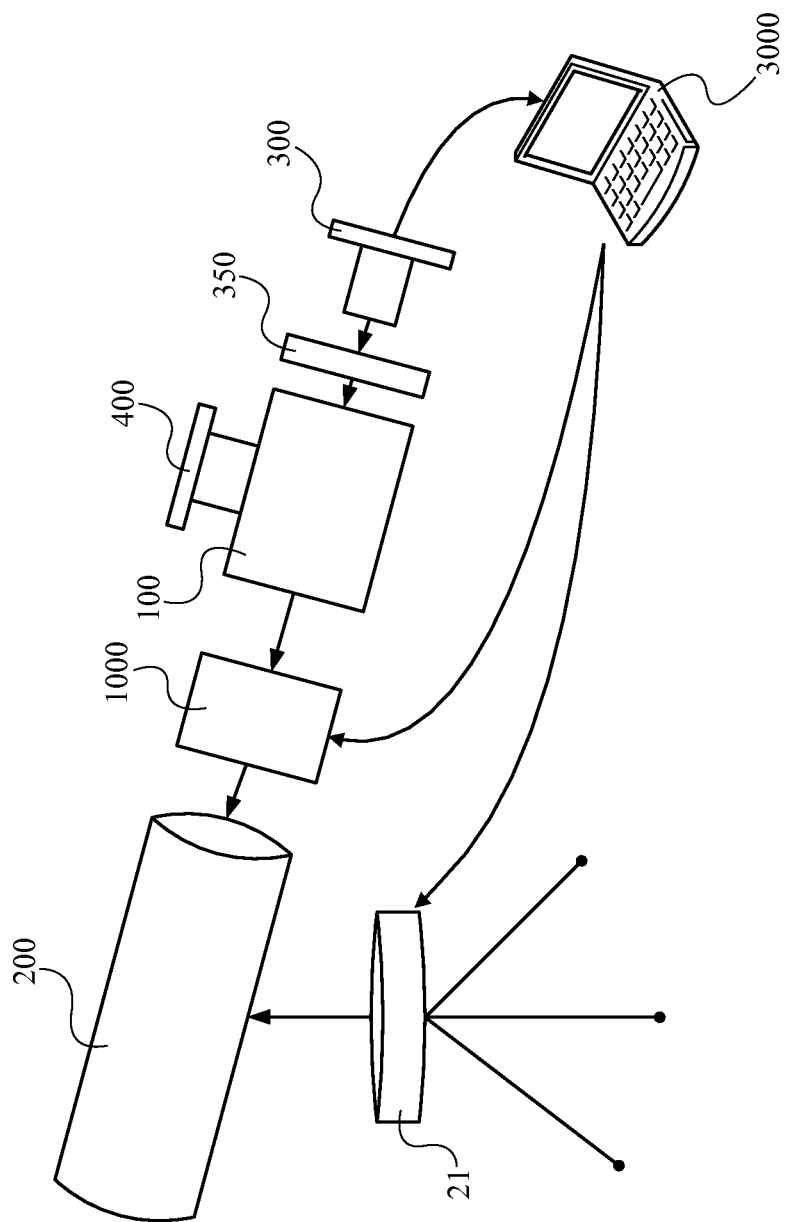
FIG. 17 illustrates an on-axis guide system coupled to a computing device and a main scope according to an embodiment of the present invention.

In the preferred embodiment of the present invention, a system for tracking and imaging an object can include the main scope body 200, the optical enhancement module 1000, and the on-axis dichroic guide system 100. The main scope body 200 can be operatively coupled to a movable mount 21 and a computing device 3000 as shown in FIG. 17. The computing device 3000 can further be coupled to the guide member 300 thereby providing input images to the computing device 3000 for automatically adjusting the movable mount 21, the optical enhancement module 1000, and the X-Y stage 350. In the preferred embodiment, the optical enhancement module 1000 can be integrated within the on-axis dichroic guiding system 100. In the other embodiments, the optical enhancement module 1000 can be a separate component operatively mounted between the main scope body 200 and the on-axis dichroic guide system 100. Details of the automatic adjusting of the moveable mount 21 and the optical enhancement module 1000 using the computing device 3000 will be described in greater detail within the present invention below.

In operation, the light enters through the viewing aperture 250, travels through the main scope body 200 along the scope axis 600, and exits through the visual back 280. Light exiting through visual back 280 enters the on-axis dichroic guide system 100 through the scope port 110. As light travels through the on-axis dichroic guide system 100 along the scope axis 600, the light in the visible spectrum band is reflected by the optical beam splitter 160 towards the imaging port 190 along the imaging axis 500 perpendicular to the scope axis 600. The arrangement of the imaging port 190 relative to the scope axis 600 can be any position including perpendicular to the scope axis 600 as long as the imaging port 190 does not have a viewing axis parallel to the scope axis 600. The visible light travels through the imaging port 190 and can be received by the imaging member 400. In the preferred embodiment, the imaging member 400 can be a CCD camera configured to capture the visible light as image data as commonly known in the arts. In embodiments where the imaging member 400 is a CCD camera, the imaging member 400 can be configured to capture image data in predetermined exposure times as desired for a particular imaging task. Due to the optical arrangement of the main scope body 200 and the on-axis dichroic guide system 100, the light data received by the imaging member 400 will have an imaging field of view 401.

Figure 18:
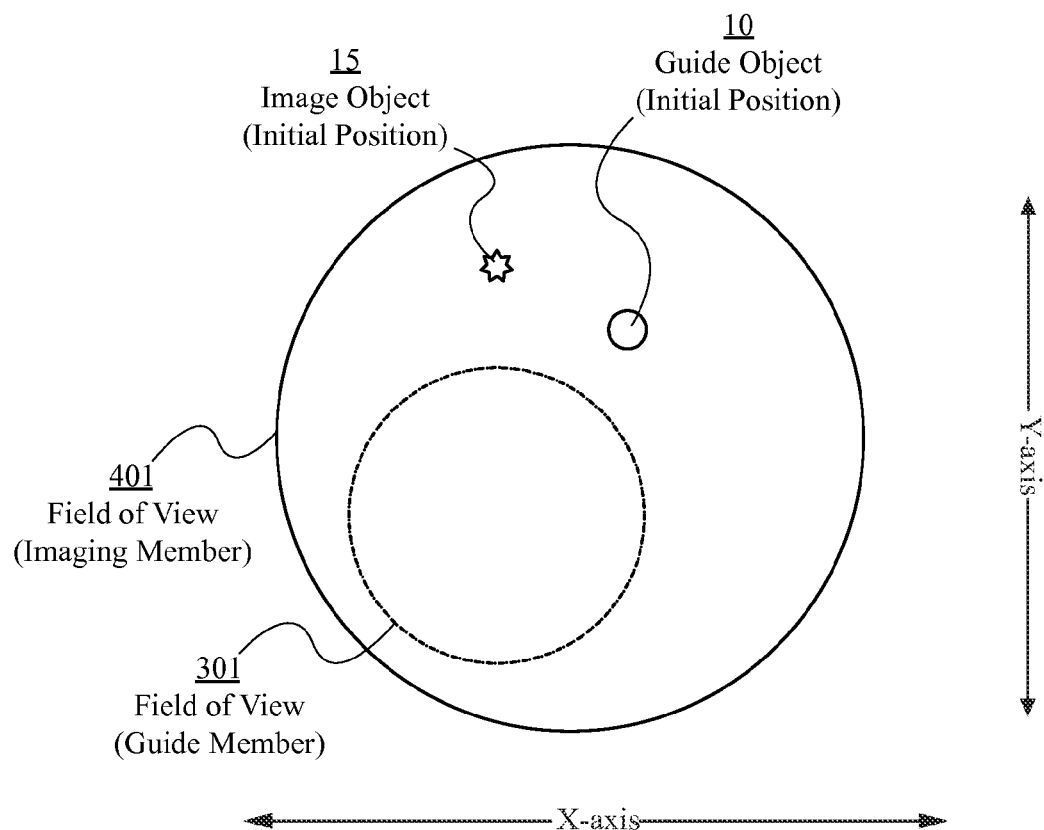
FIG. 18 illustrates an image object and a target object within the field of view of an imaging member according to an embodiment of the present invention.

Simultaneously, as the visible light is reflected by the optical beam splitter 160, the infrared spectrum band light is transmitted through the optical beam splitter 160 along the scope axis 600 towards the guide member 300. Infrared light passing through the optical beam splitter 160 travels through the guide port 170 and can be received by the guide member 300. In the preferred embodiment, the guide member 300 can be coupled to the Y-plate 354 and the X-Y stage 350 can be coupled to the on-axis dichroic guide system 100 by the base plate 351. Light traveling through the guide port 170 can further travel through the X-Y stage 350 towards the guide member 300. In such a configuration, light travels through the X-Y stage 350, along the scope axis 600, through the X-Y aperture 357, and towards the guide member 300. In the preferred embodiment, the guide member 300 can be a CCD camera configured to capture infrared light as image data as commonly known in the arts. In embodiments where the guide member 300 is a CCD camera, the guide member 300 can be configured to capture infrared image data in predetermined exposure times as desired for a particular imaging or guiding task. Due to the optical arrangement of the main scope body 200 and the on-axis dichroic guide system 100, the guide member 300 will have a guide field of view 301, typically being a portion of the imaging field of view 401 of the imaging member 400 as shown in FIG. 18.

Figure 19:
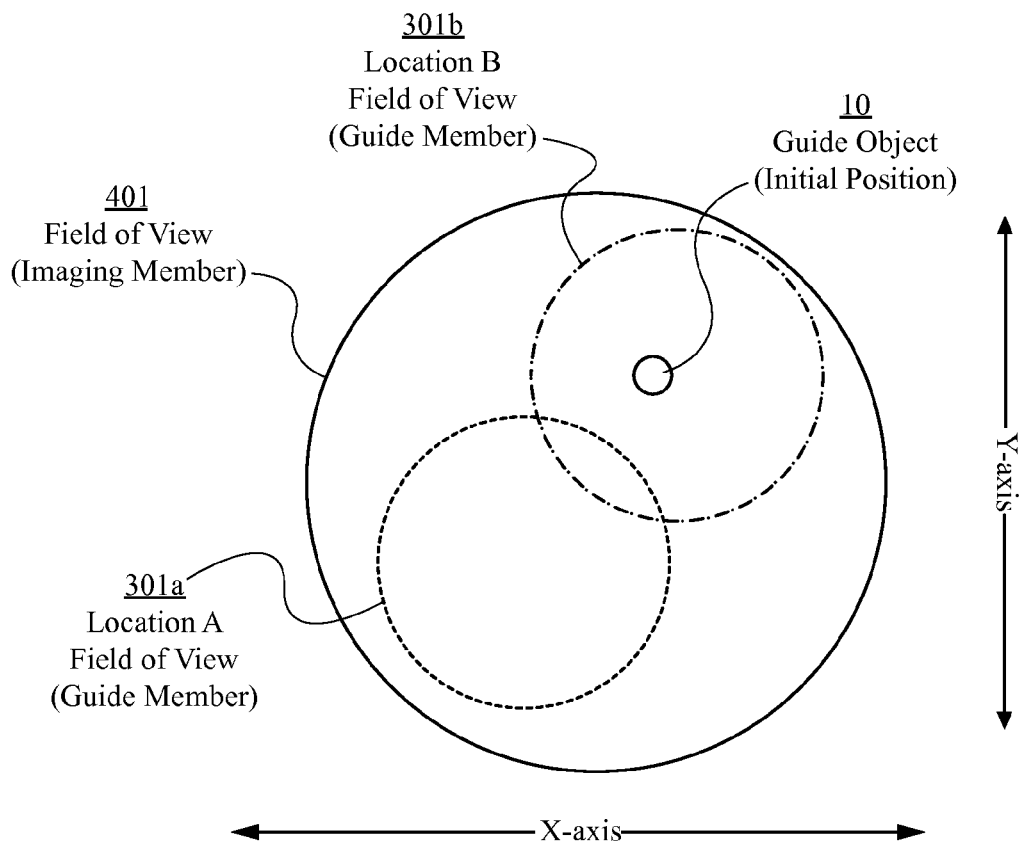
FIG. 19 illustrates the movement of the field of view of a guide member within the field of view of an imaging member according to an embodiment of the present invention.
Figure 20:
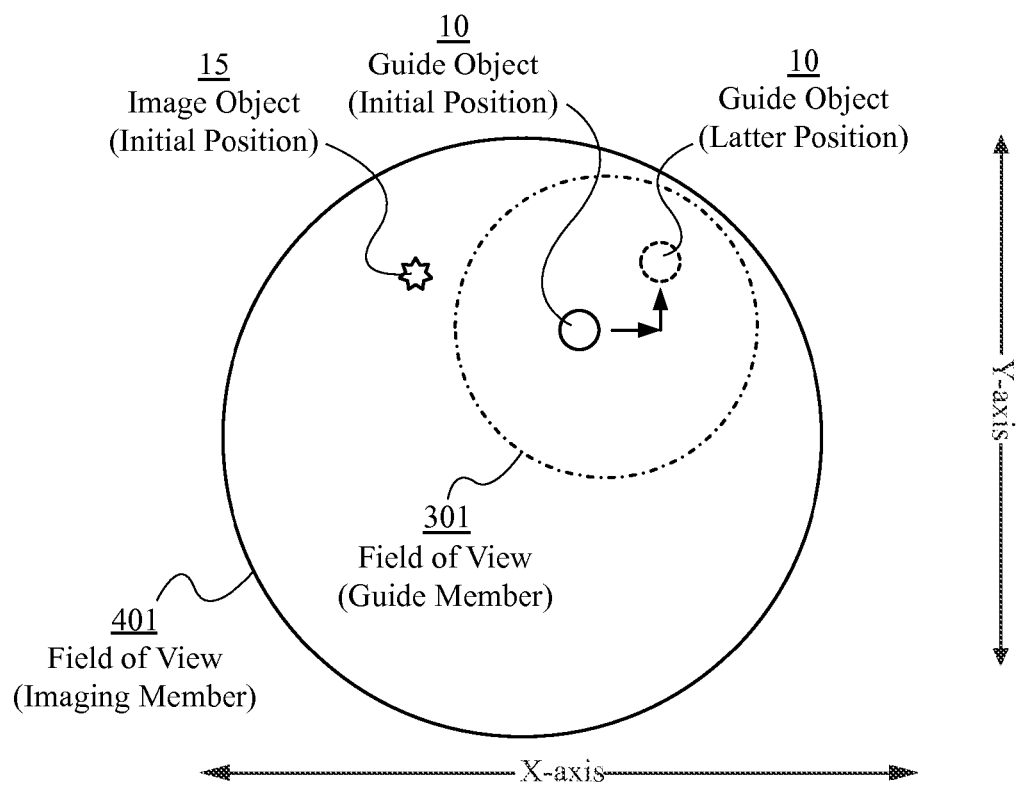
FIG. 20 illustrates the movement of a guide object within the field of view of an imaging member according to an embodiment of the present invention.

Once the main scope body 200 has been positioned so that a desired image object 15 is within the defined imaging field of view 401 of the imaging member 400, the guide member 300 can be adjusted using the X-Y stage 350 to move the defined guide field of view 301 to a position within the defined imaging field of view 401 so as to contain an appropriate guide object 10 as shown in FIG. 19. Movement of the X-Y stage 350 in the X and Y directions (along X-axis and Y-axis, respectively) can be accomplished by moving the X-plate 352 for adjustments along the X-axis and by moving the Y-plate 354 for adjustments along the Y-axis, while both the X-plate 352 and the Y-plate 354 are movable relative to the base plate 351. FIG. 19 shows an initial guide field of view 301*a* at an initial location A within the imaging field of view 401. As described, the guide member 300 can be adjusted using the X-Y stage 350 to reposition the guide field of view 301 at a location B in order to define a new guide field of view 301*b*. The new guide field of view 301*b* is arranged so that the guide object 10 is encompassed within the new guide field of view 301*b*. Once the guide field of view 301 is appropriately located within the imaging field of view 401, the X-Y stage 350 can be fixed (temporarily located) at this position during the imaging process.

In order to compensate for the movement of the earth (and other movement factors) information obtained from the guide member 300 can be used to properly adjust the imaging field of view 401 (and thus the guide field of view 301) using at least one movable mount 21 (e.g. an electro-mechanical drive mount). In the preferred embodiment, the optical enhancement module 1000 can be coupled to the on-axis guide system 100 to further adjust the imaging field of view 401 during the imaging process. By operatively coupling the computing device 3000 to the guide member 300, tracking image data can be supplied from the guide member 300 to the computing device 3000. The computing device 3000 can be further coupled to the movable mount 21 and the optical enhancement module 1000 to provide movement control signals thereto, allowing automated adjustment of the imaging field of view 401 during the imaging process.

In the preferred embodiment, the computing device 3000 receives tracking image data from the guide member 300 and processes the tracking image data in order to evaluate the movement of the guide object 10. At the onset of an imaging process, the computing device 3000 can be configured to capture an initial tracking image (tracking reference image) from the guide member 300 and store this tracking reference image for later processing. As the imaging process proceeds, the guide member 300 can provide guide image data to the computing device 3000 at predetermined intervals, which allows the computing device 3000 to evaluate the movement of the guide object 10 relative to its initial position within the tracking reference image. Using predetermined thresholds of deviation in the location of the guide object 10, the computing device 3000 can determine when and how to adjust the imaging field of view 401 during the imaging process. For example, once the guide object 10 has moved in either the x-direction or the y-direction (or both) a distance exceeding a predefined threshold, the computing device 3000 can determine how to adjust the imaging field of view 401 to maintain the image object 15 at an appropriate location during the imaging process. In an implementation, the computing device 3000 can be configured to adjust the imaging field of view 401 in real time without the need to evaluate predetermined thresholds.

In the preferred embodiment, the computing device 3000 can use an adjustment algorithm to determine what adjustment control signals to provide to the moveable mount 21 and to the optical enhancement module 1000. Also in the preferred embodiment, the computing device 3000 is configured to provide generally larger adjustment control signals to the movable mount 21 and fine fast tuning adjustment control signals to the optical enhancement module 1000. The calculations made by the computing device 3000 can be based on the movement of the guide object 10 within the tracking image data provided by the guide member 300. For example, the movement of the guide object 10 can be determined by excitation information of adjacent pixels (or partial pixel excitation) when the guide member 300 is a CCD (or complementary metal oxide semiconductor (CMOS)) type imaging device as commonly known in the arts.

In the preferred embodiment, the computing device 3000 can be configured to adjust the moveable mount 21 based on the evaluation of the guide image and/or the imaging image relative to a predetermined movement threshold, while providing real time adjustments to the adaptive optical enhancement mechanism 1000. In other embodiments, the computing device 3000 can monitor the position of the tilt/tip optical element 1500 in conjunction with the movement information obtained from the guiding image and/or the imaging image in order to determine when to adjust the moveable mount 21 based on keeping the tilt/tip optical element 1500 within predetermined movement ranges.

As control signals provided by the computing device 3000 cause the movable mount 21 to adjust the imaging field of view 401, there may be small fluctuations caused by the mechanical components of the movable mount 21 in the image received by the imaging member 400. Such fluctuations can be caused by vibration of driving actuators or the movement of the drive assembly within the movable mount 21. In order to compensate for these fluctuations in the imaging field of view 401 (and thus the image received by the imaging member 400), the computing device 3000 can be configured to send additional adjustment control signals to the optical enhancement module 1000 to adjust the imaging field of view 401. In the preferred embodiment of the optical enhancement module 1000, as depicted in FIG. 6 through 9, the control signals supplied to the optical enhancement module 1000 can control the adaptive optics drive system 1550. The adaptive optics drive system 1550 can adjust the orientation of the tilt/tip optical element 1500 to further compensate for the movement of the image object 15 and, thus, compensate for the movement of received visible light of the image object 15 by the imaging member 400.

The control signals received by the optical enhancement module 1000, and thus the adaptive optics drive system 1550, can adjust the tilt/tip optical element 1500 in the X and Y directions so as to maintain the light indicative of the image object 15 received by the imaging member 400 in a relatively consistent position relative to the imaging member 400 (e.g. a CCD camera). The adaptive optics drive system 1550 can use the pair of linear drive actuators 1555 to cause the tilt/tip optical element 1500 to move in the X-direction and/or the Y-direction as required by the computing device 3000. For example, when control signals received by the optical enhancement module 1000 require that the tilt/tip optical element 1500 adjust in a tilt direction A, both of the linear drive actuators 1555 can be used to rotate the tilt/tip optical element 1500 about a first pivot axis 1551 as shown in FIG. 7.

Figure 16:
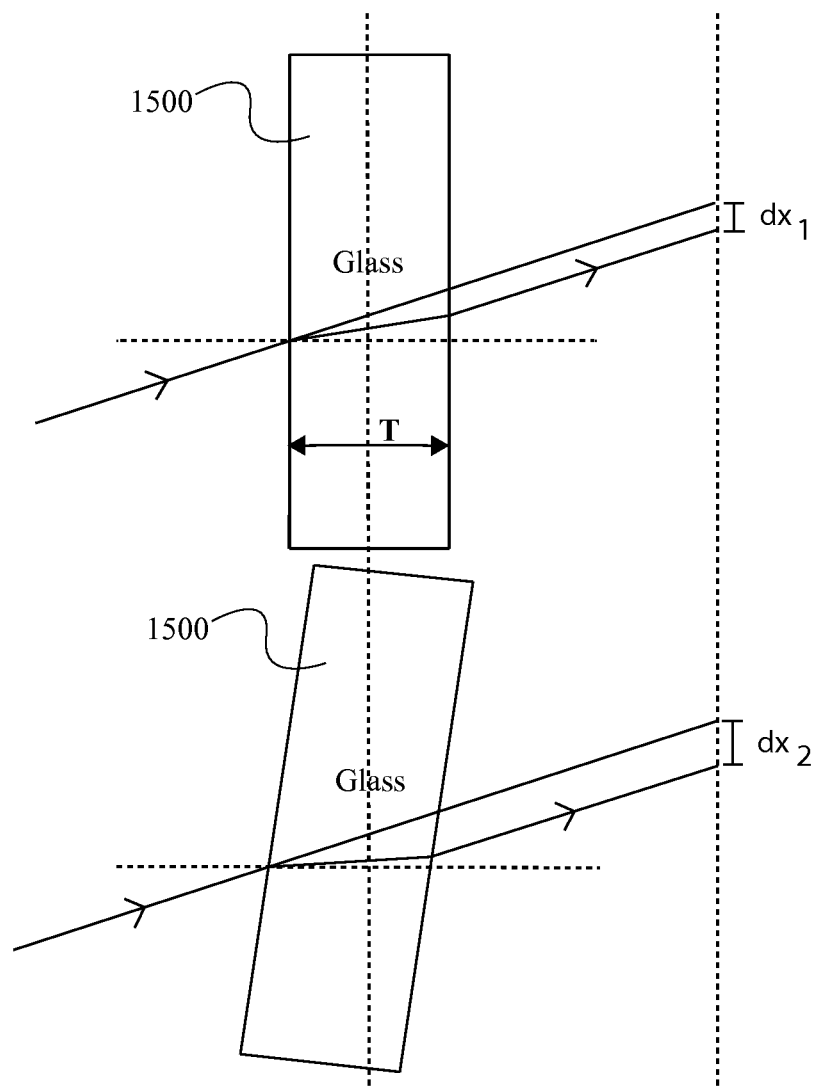
FIG. 16 depicts the deviation of light transmitted through an optical element according to an embodiment of the present invention.

When such an adjustment is made, the light passing through the tilt/tip optical element 1500 will be moved in the Y-direction along the Y-axis. FIG. 16 shows light passing through the tilt/tip optical element 1500. For the light passing through the tilt/tip optical element 1500 along any axis other than the scope axis 600, a deviation $dx_1$ in location of the exiting light occurs due to the optical configuration of the tilt/tip optical element 1500. As the tilt/tip optical element 1500 is rotated in direction A (and similarly for rotation in direction B), the new deviation $dx_2$ occurs as a result of the new angle of the tilt/tip optical element 1500 relative to the scope axis 600. Therefore, the rotation of the tilt/tip optical element 1500 in either direction A or direction B will result in a corresponding movement of the location of the exiting light from the tilt/tip optical element 1500 along either the X-axis or Y-axis, respectively. Therefore, the movement of the tilt/tip optical element 1500 can adjust (and thus compensate for movement of the imaging object 15) the location of light received by the imaging member 400.

Figure 10:
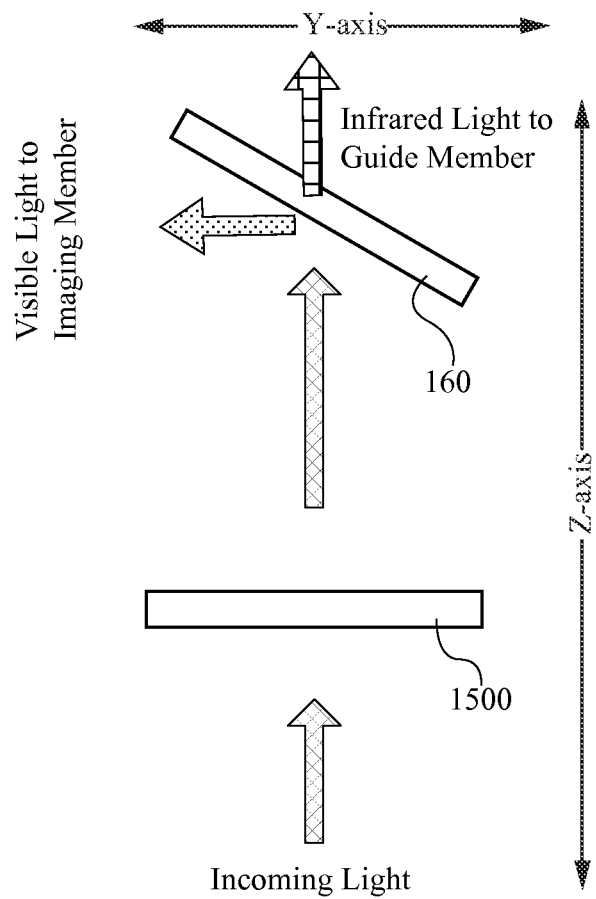
FIG. 10 illustrates the light paths of light within an on-axis guide system according to an embodiment of the present invention.
Figure 11:
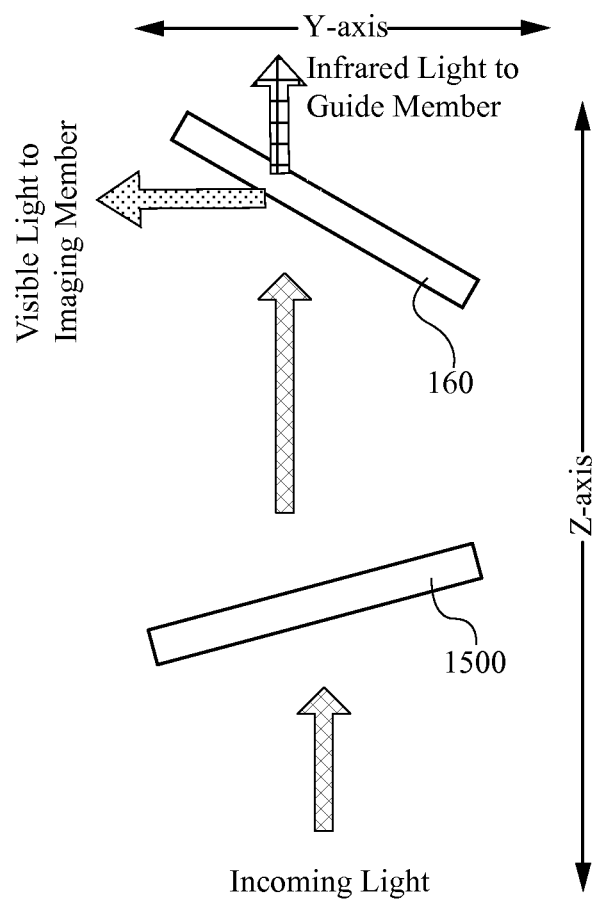
FIG. 11 depicts the movement of image light according to an embodiment of the present invention.
Figure 12:
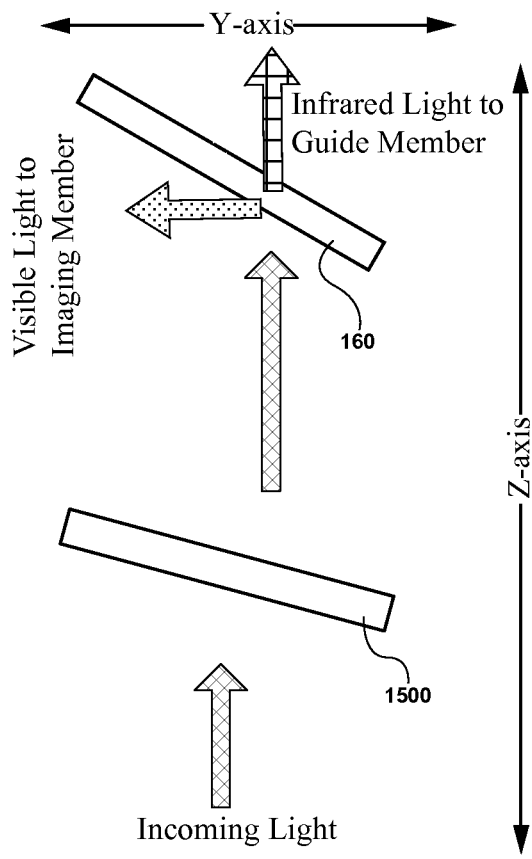
FIG. 12 depicts the movement of image light according to an embodiment of the present invention.

More specifically, for light passing through the tilt/tip optical element 1500 in an orientation perpendicular to the scope axis 600 (as shown in FIG. 10), the exiting light will be along the same axis as the entering light. As the tilt/tip optical element 1500 is orientated in a first direction A, light entering the tilt/tip optical element 1500 will exit the tilt/tip optical element 1500 along an axis parallel to the entering light angle, but the exiting light will be offset by a deviation along the Y-axis as shown in FIG. 11. Similarly, as the tilt/tip optical element 1500 is rotated in a second direction A, the light entering the tilt/tip optical element 1500 will exit the tilt/tip optical element 1500 along an axis parallel to the angle of entry, but the exiting light will be offset by a deviation along the Y-axis as shown in FIG. 12. Such a configuration allows the orientation of the tilt/tip optical element 1500 to control the location of the exiting light from the tilt/tip optical element 1500 along the Y-axis. Therefore, the optical enhancement module 1000 can use control signals from the computing device 3000 to control the location of light (in the Y-axis) received by the imaging member 400.

Figure 13:
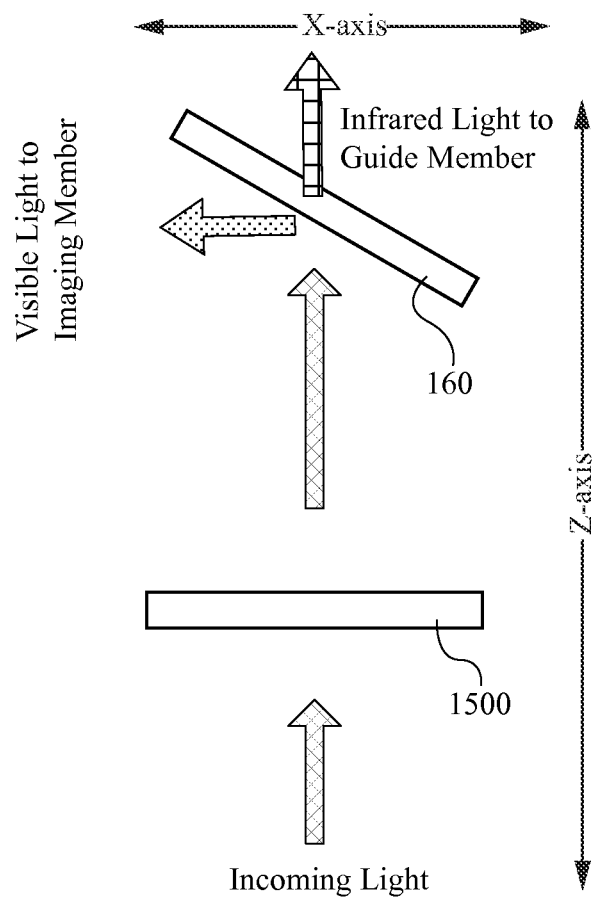
FIG. 13 illustrates the light paths of light within an on-axis guide system according to an embodiment of the present invention.
Figure 14:
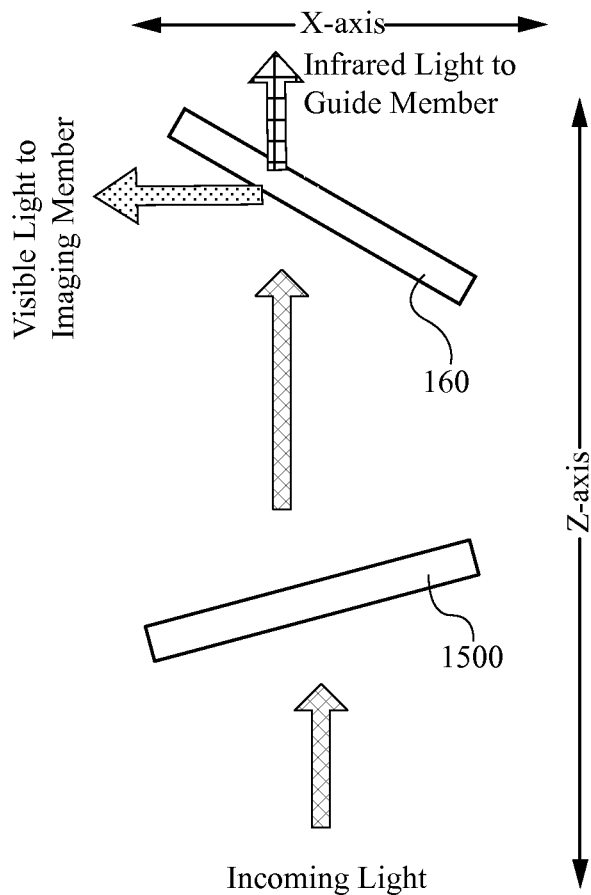
FIG. 14 depicts the movement of image light according to an embodiment of the present invention
Figure 15:
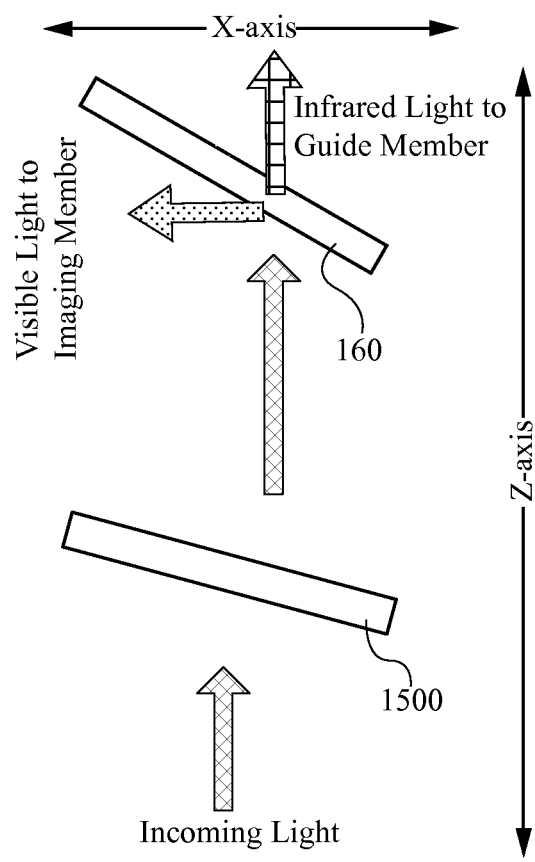
FIG. 15 depicts the movement of image light according to an embodiment of the present invention.

Similar to the description for control of the Y-axis location of light received by the imaging member 400, the optical enhancement module 1000 can control the X-axis of light received by the imaging member 400. For light passing through the tilt/tip optical element 1500 in an orientation perpendicular to scope axis 600 (as shown in FIG. 13), the exiting light will be along the same axis as the entering light. As the tilt/tip optical element 1500 is orientated in a first direction B, the light entering the tilt/tip optical element 1500 will exit the tilt/tip optical element 1500 along an axis parallel to the entering light angle, but the exiting light will be offset by a deviation along the X-axis as shown in FIG. 14. Similarly, as the tilt/tip optical element 1500 is rotated in a second direction B, the light entering the tilt/tip optical element 1500 will exit the tilt/tip optical element 1500 along an axis parallel to the angle of entry, but the exiting light will be offset by a deviation along the X-axis as shown in FIG. 15. Such a configuration allows the orientation of the tilt/tip optical element 1500 to control the location of the exiting light from the tilt/tip optical element 1500 along the X-axis. Therefore, the optical enhancement module 1000 can use control signals from the computing device 3000 to control the location of light (in the X-axis) received by the imaging member 400.

In the above description of adjusting the orientation of the tilt/tip optical element 1500, the deviation of the light movement passing through the tilt/tip optical element 1500 can be approximated using equation 1, which is shown below. As shown in equation 1, the incoming light (as shown in FIG. 10 through 15) can arrive with an incident angle $\theta_i$. The deviation dx can be approximated based on the thickness T of the tilt/tip optical element 1500 and the refraction index n of the material of the tilt/tip optical element 1500.

$$dx = [\theta_i * T * (n-1)]/n \text{(in radians)} \qquad \text{Equation 1}$$

In the preferred embodiment, the computing device 3000 can be operative to compute the deviation dx resulting from the different orientations of the tilt/tip optical element 1500 in order to determine the best orientation of the tilt/tip optical element and thus provide appropriate control signals to the optical enhancement module 1000 in order to maintain the image object 15 in a consistent position while being received by the imaging member 400.

Figure 22:
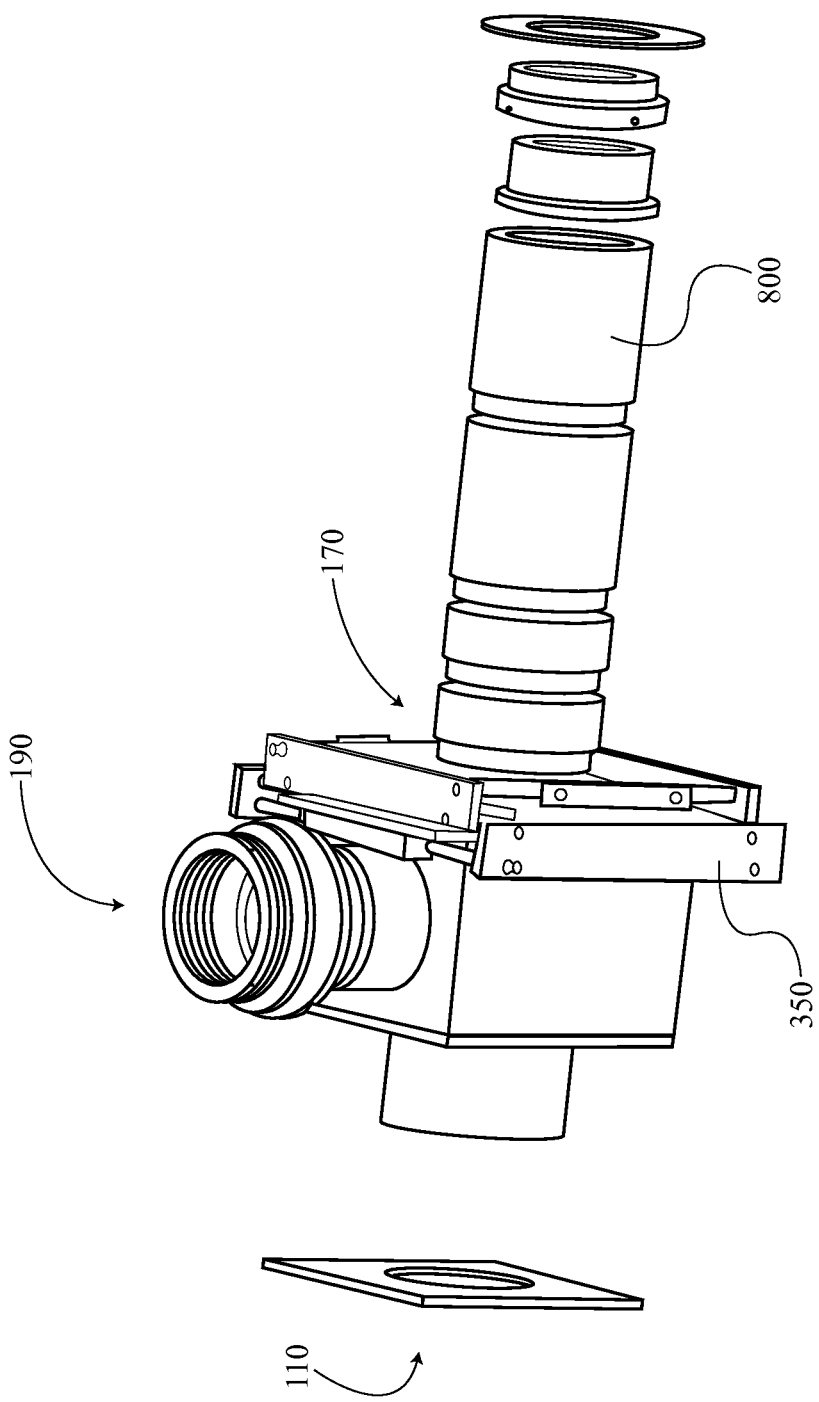
FIG. 22 illustrates a light amplification module coupled to an on-axis guide system according to an embodiment of the present invention.

In the preferred embodiment, a light amplification module 800 can be positioned between the on-axis guiding system 100 and the guide member 300 as shown in FIG. 22. The light amplification module 800 can be configured to increase the intensity of infrared light received by the guide member 300. Such a configuration provides the ability to increase the potential for locating a guide object 10 bright enough within the imaging field of view 401 to properly track the imaging object 15. Light amplification module 800 can include an optical amplifier (not shown) so as to provide an increase in the intensity of infrared light compared to the light entering the light amplification module 800. In some embodiments, the light amplification module 800 can be an image intensifying tube (IIT) or an electron multiplied CCD. The light amplification module 800 can be configured to amplify the entering light in a manner similar to known techniques used in night vision goggles, as is typical of an image intensifying tube.

In the preferred embodiment, the optical enhancement module 1000 can be configured with the adaptive optics mechanism 1100 including the tilt/tip optical element 1500 as a lens element having a non-flat surface as shown in FIG. 23 through 26. As previously described, the lens arrangement also allows the tilt/tip optical element 1500 to be orientated to cause locational movement of the image object 15 while being received by the imaging member 400. When configuring the optical enhancement module 1000 with a tilt/tip optical element 1500, the adaptive optics mechanism 1100 can further provide a focusing function. Since the tilt/tip optical element 1500 is a lens arrangement, the movement of the tilt/tip optical element 1500 in along the Z-axis allows for a focusing of the image object 15 as received by the imaging member 400. More specifically, for the embodiments where the tilt/tip optical element 1500 is a flat surface element, the optical power is one, and there is no change in the image size when moving the tilt/tip optical element 1500 towards or away from the optical focusing plane of the imaging member 400. When the optical enhancement module 1000 is configured with a non-flat tilt/tip optical element 1500a (e.g. a lens arrangement), the optical power of the non-flat tilt/tip optical element 1500a will be greater or less than one. The optical power of the non-flat tilt/tip optical element 1500a can be a result of the radius of an at least one non-flat surface (e.g. a large radius). Therefore, the position of the non-flat tilt/tip optical element 1500a relative to the focal plane of the imaging member 400 must be considered. Since the movement of the non-flat tilt/tip optical element 1500a in the A and B directions will be relatively small, the aberrations in the received image by imaging member 400 will be generally few. Therefore, if the non-flat tilt/tip optical element 1500a is configured to be adjusted along the Z-axis, a fine fast focusing effect can be realized.

Figures 25, 26:
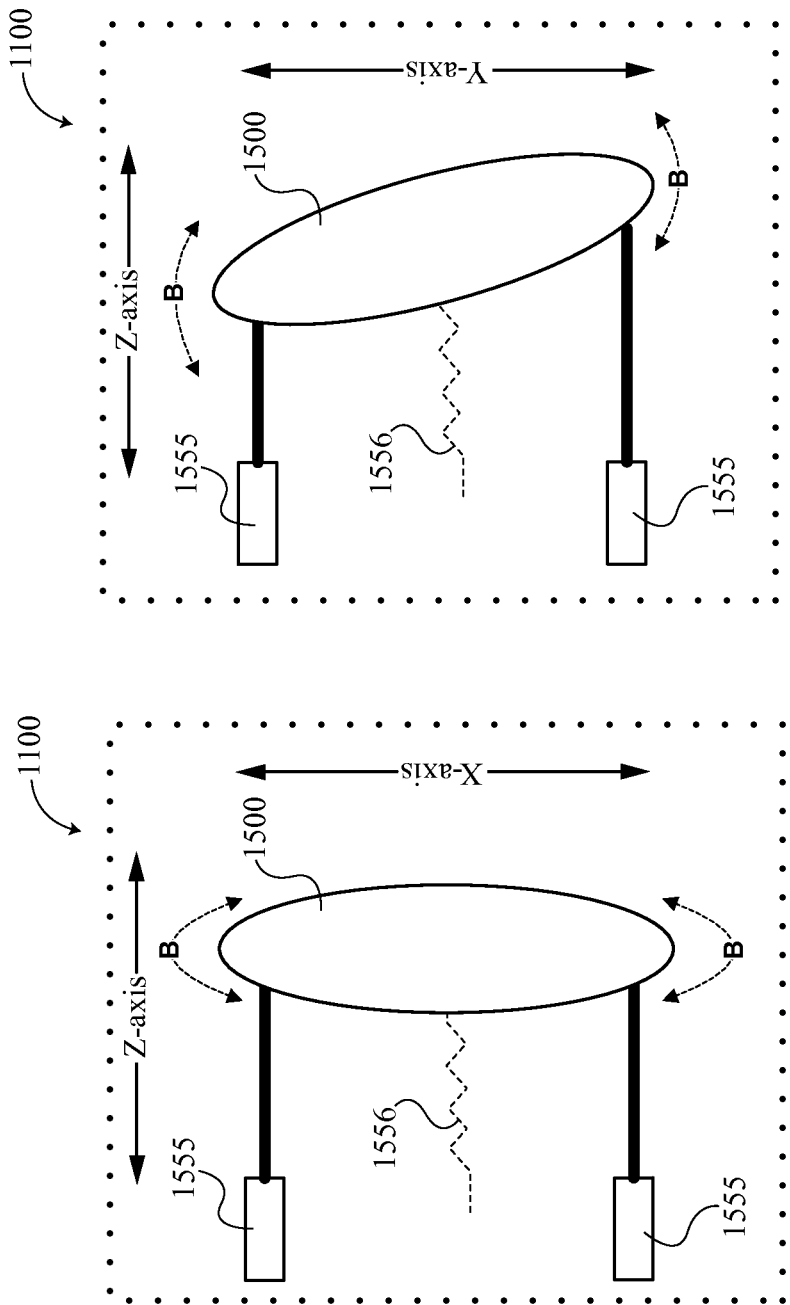
FIG. 25 illustrates an orientation of an adaptive optics mechanism according to an embodiment of the present invention.
FIG. 26 illustrates an orientation of an adaptive optics mechanism in a tip direction according to an embodiment of the present invention.

In the preferred embodiment, the output form of the imaging member 400 and/or the guide member 300 received by the computing device 3000 can be monitored for image focus quality. The computing device 3000 can use the imaging data from the imaging member 400 and the guiding member 300 to determine if a focus correction should be made. The computing device 3000 can then provide control signals to the optical enhancement module 1000 (and thus the adaptive optics mechanism 1100) to make the appropriate adjustment to the non-flat tilt/tip optical element 1500a along the Z-axis as shown in FIGS. 25 and 26. The computing device 3000 can be configured to monitor the guide image and the imaging image in order to determine how any focusing adjustment needs to be made. Therefore, in between imaging exposures, the computing device 3000 can provide the necessary control signals to the adaptive optics module 1000 in order to perform any focusing adjustments. The focusing adjustment of the adaptive optics module 1000 needs to be performed in between imaging exposures in order to prevent any distortion of the captured image during those exposure events.

Figure 27:
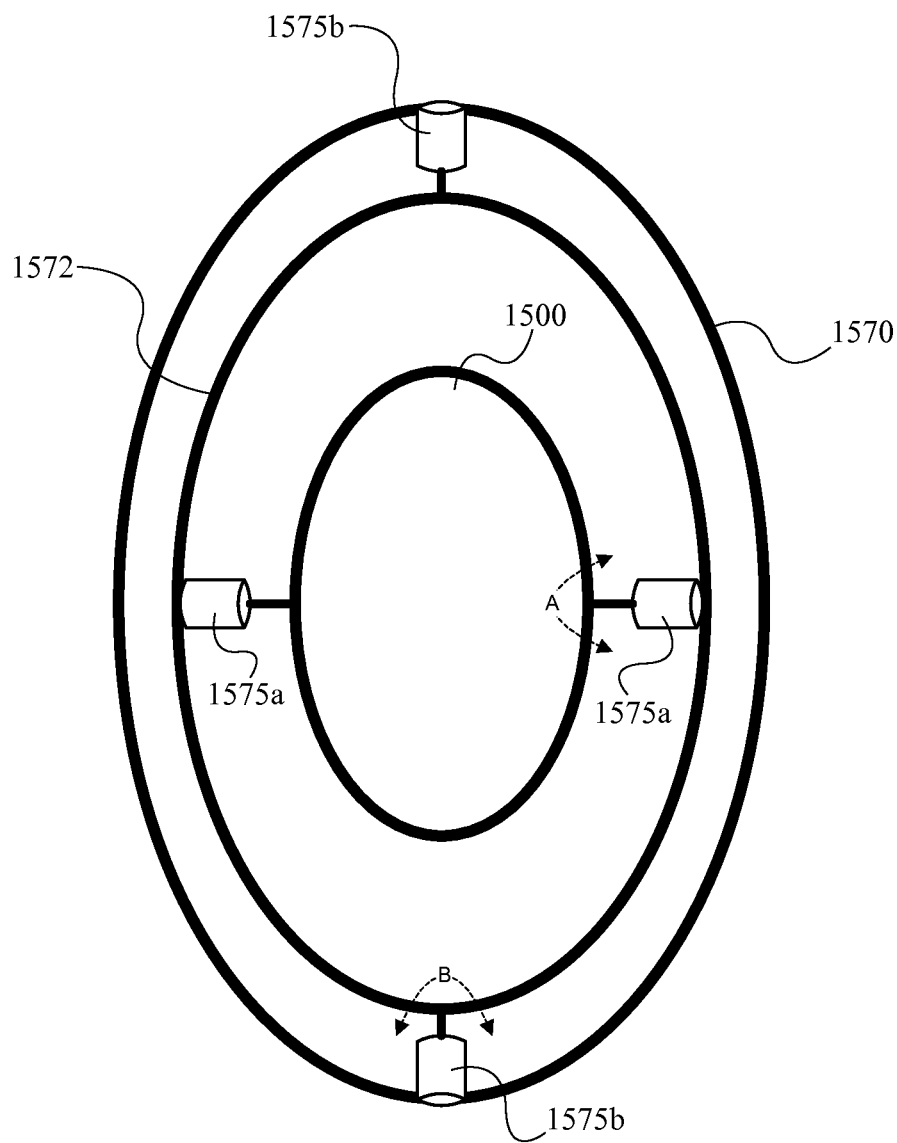
FIG. 27 illustrates an adaptive optics mechanism according to an embodiment of the present invention.

In an implementation, the adaptive optics mechanism 1100 can be configured to accomplish the movement of the non-flat tilt/tip optical element 1500a in the A and B directions as shown in the arrangement of FIG. 27. Shown in FIG. 27 is the non-flat tilt/tip optical element 1500a having the adaptive optics drive system 1550 including a plurality of drive actuators 1575, a first mounting frame 1570, and an inner frame 1572. To effectuate the movement of the tilt/tip optical element 1500 in the A direction, the computing device 3000 can provide control signals indicative of the desired orientation of the non-flat tilt/tip optical element 1500a. For control signals requiring a movement of the non-flat tilt/tip optical element 1500a in the A direction, some of the drive actuators 1575a can be actuated to rotate the non-flat tilt/tip optical element 1500a about an axis defined between those drive actuators 1575a. Similarly, for control signals requiring the movement of the non-flat tilt/tip optical element 1500a in the B direction, the other drive actuators 1575b can be actuated to rotate the non-flat tilt/tip optical element 1500a about an axis defined between the other drive actuators 1575b. As previously described, the location changes of the image object can be compensated by the actuation of the adaptive optics mechanism 1100 of the non-flat tilt/tip optical element 1500a in a similar manner to the adaptive optics mechanism 1100 for the tilt/tip optical element 1500. The type of non-flat tilt/tip optical element 1500a as described in relation to FIG. 27 can be configured to both control the image object location relative to the imaging member 400 and/or configured to provide the fine fast focusing function as previously described.

Figure 28:
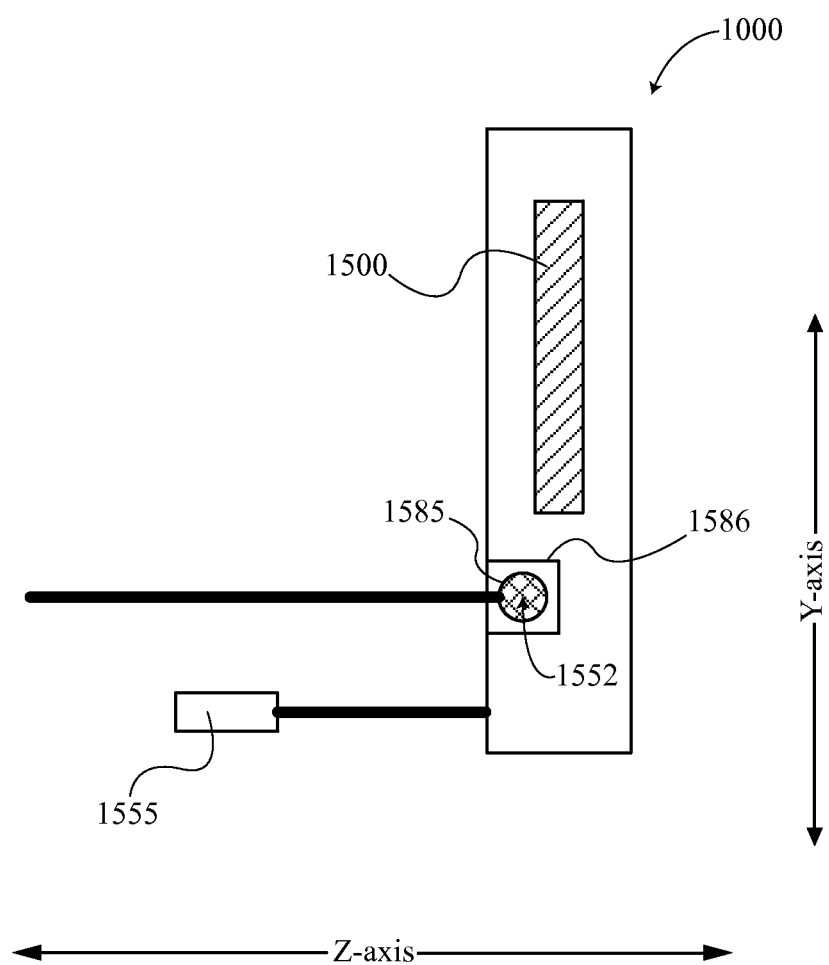
FIG. 28 illustrates an optical enhancement module according to an embodiment of the present invention.
Figure 29:
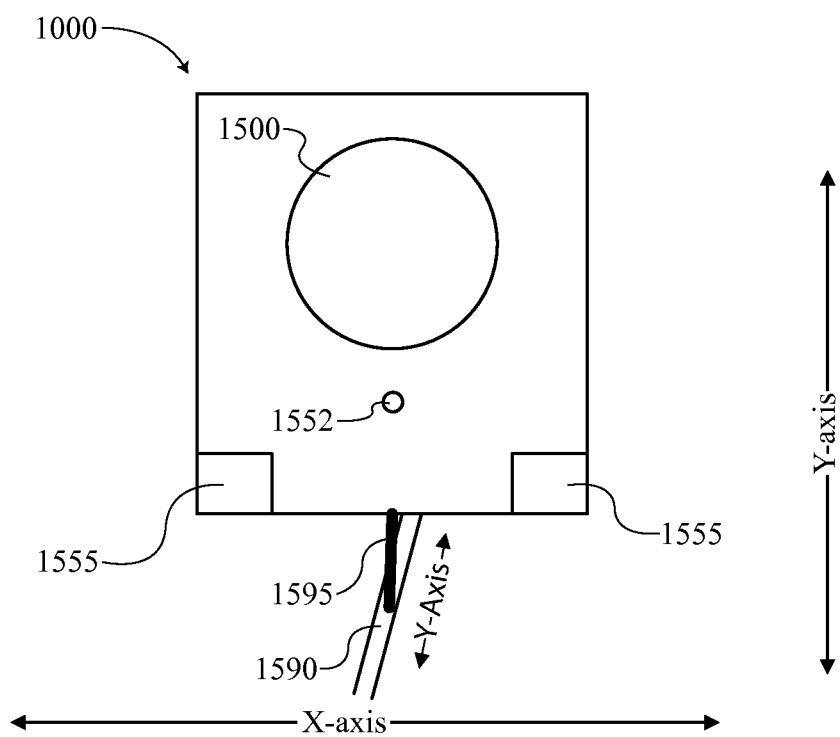
FIG. 29 illustrates an optical enhancement module according to an embodiment of the present invention.

In the preferred embodiment, the optical enhancement module 1000 (and thus the tilt/tip optical element 1500 or the non-flat tilt/tip optical element 1500a) can be adjusted by the drive actuators 1575 in order to pivot the tilt/tip optical element 1500 or the non-flat tilt/tip optical element 1500a using a pivot ball 1585 coupled to a socket 1586 as shown in FIGS. 28 and 29. The drive actuators 1575 can be configured to operate in a manner as described in conjunction with FIG. 6 through 9 and FIG. 23 through 26. When configured for the movement in the Z-axis for fine fast focusing, the adaptive optics mechanism 1100 can further include a stabilizing member 1595 operatively coupled within a stabilizing slot 1590. Movement of the tilt/tip optical element 1500 in the Z-direction can be stabilized by stabilizing member 1595 moving freely in the Z-direction while being laterally stabilized in the X-direction.

Figure 30:
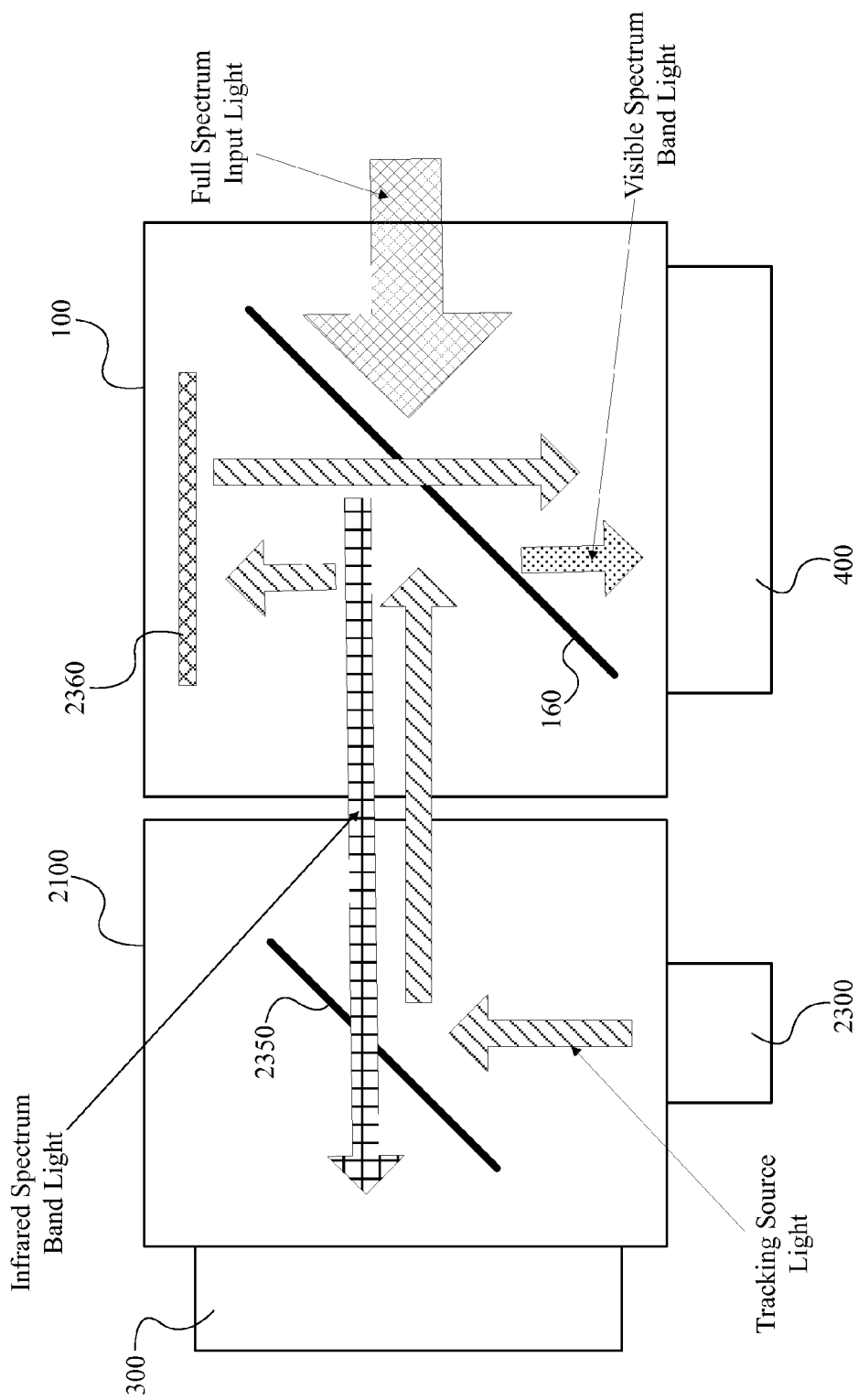
FIG. 30 illustrates a tracking module according to an embodiment of the present invention.

In the preferred embodiment, a targeting device 2100 can be coupled between the guide member 300 and the on-axis dichroic guide system 100 as shown in FIG. 30. The targeting device 2100 can include a targeting beam splitter 2350 and a targeting source 2300. The targeting beam splitter 2350 can be configured to allow infrared light to pass through while reflecting targeting light emitted from targeting source 2300. The targeting source 2300 can be any light source capable of generating a proper light to be received by the imaging member 400. In the preferred embodiment, the targeting source 2300 is configured to have an emitting source located so as to correspond to the center of the field of view of the guide member 300.

In operation, input light enters the on-axis dichroic guiding system 100, the visible light is reflected towards the imaging member 400, and the infrared light passes through the beam splitter 160 towards the guide member 300 as previously described. The infrared light continues towards and passes through the targeting beam splitter 2350 and is received by the guide member 300. When desired, the targeting source 2300 can emit a targeting light towards the targeting beam splitter 2350. The targeting light is reflected by the targeting beam splitter 2350 towards the beam splitter 160 of the on-axis dichroic guide system 100. The beam splitter 160 reflects the targeting light towards an additional mirror 2360 located across from the imaging member 400. The additional minor 2360 reflects the targeting light reflected from beam splitter 160 in an opposite direction towards the imaging member 400.

The targeting light received by the imaging member 400 can be used to track the position of the guide field of view 301 within the imaging field of view 401. Since it is difficult to determine where the guide field of view 301 is located within the imaging field of view 401, the use of the tracking device 2100 can allow the computing device 3000 to determine the location of the center of the guide field of view 301 so that the computing device 3000 can provide control signals to the X-Y stage 350, which moves the guide field of view 301 into an appropriate position within the imaging field of view 401.

Although the invention has been explained in relation to its preferred embodiment, it is to be understood that many other possible modifications and variations can be made without departing from the spirit and scope of the invention as hereinafter claimed.

What is claimed is:
1. An on-axis guide system, comprising:
a system body;
a scope port;
a guide port;
an imaging port;
a dichroic beam splitter;
said scope port being positioned adjacent to said system body;
said guide port being positioned adjacent to said system body;
said guide port being positioned opposite to said scope port such that said system body is between said guide port and said scope port;
a scope axis centrally traversing through said system body between said scope port and said guide port;
an imaging axis centrally traversing through said system body and perpendicularly intersecting said scope axis;
said imaging port being positioned adjacent to said system body along said imaging axis;
said dichroic beam splitter being positioned within said system body;
said dichroic beam splitter being arranged to reflect visible spectrum band light towards said imaging port;

said dichroic beam splitter being arranged to allow infrared spectrum band light to pass through and travel towards said guide port;

an imaging member being coupled to said imaging port, wherein said imaging member is configured to receive the visible spectrum of band light and has an imaging field of view;

a guide member being coupled to said guide port, wherein said guide member is configured to receive the infrared spectrum band light and has a guide field of view; and a computing device.

2. The on-axis guide systems as claimed in claim 1, wherein said dichroic beam splitter is a cold mirror.

3. The on-axis guide system as claimed in claim 1, wherein said imaging member or said guide member can be a charge couple device sensor.

4. The on-axis guide system as claimed in claim 1, further comprising:

an X-Y stage being coupled between said guide port and said guide port member, wherein said X-Y stage is configured to move said guide member within said imaging field of view.

5. The on-axis guide system as claimed in claim 4, wherein said X-Y stage comprises a base plate, an X-plate, and a Y-plate, further wherein said X-plate is movable in an X-direction relative to said base plate and said Y-plate is movable in a Y-direction relative to both said X-plate and said Y-plate;

said base plate being coupled to said guide port; and a plurality of adjustment members being operatively coupled between said base plate and said X-plate and being operatively coupled between said X-plate and said Y-plate, wherein said X-plate and said Y-plate are adjustable relative to said base plate by using said plurality of adjustment members.

6. The on-axis guide system as claimed in claim 1, further comprising:

a scope of main body being coupled to said scope port;

said scope main body being further coupled to a movable mount, wherein said movable mount is configured to adjust said imaging field of view and is configured to adjust said guide field of view;

said computing device being operatively coupled to said movable mount;

said computing device being operatively coupled to said guide member and being operatively coupled to said imaging member, wherein said computing device is configured to receive image data from said guide member and said imaging member;

an optical enhancement module comprises an optical element and an adaptive optics mechanism; and said optical element being operatively coupled to said adaptive optics mechanism, wherein said adaptive optics mechanism adjusts orientation of said optical element in a tilt direction or tip direction.

7. The on-axis guide system as claimed in claim 6, wherein said adaptive optics mechanism comprises at least two drive actuators; and said at least two drive actuators being operatively coupled to said optical element, further wherein said optical element is adjusted in a tilt direction by simultaneously operating said at least two drive actuators in the same direction and is adjusted in a tip direction by simultaneously operating said at least two drive actuators in opposite directions.

8. The on-axis guide system as claimed in claim 6, wherein said optical element is a flat surfaced transparent component.

9. The on-axis guide system as claimed in claim 6, wherein said optical element is a non-flat surface component having an optical power other than 1.

10. The on-axis guide system as claimed in claim 9, said optical element being a lens arrangement;

said adaptive optics mechanism being further configured to move said optical element in a Z-direction, wherein actuating said adaptive optics mechanism in said Z-direction focuses said image data being received by said imaging member; and said optical enhancement module further comprises a stabilizing member, wherein said stabilizing member prevents lateral movement of said optical element.

11. The on-axis guide system as claimed in claim 6, wherein said computing device is operable to use said image data from said guide member and provide control signals to said movable mount and said optical enhancement module causing an adjustment of said imaging field of view in real time.

12. The on-axis guide system as claimed in claim 6, wherein said computing device is operable to use said image data from said imaging member and said guide member in order to provide separate control signals to said movable mount and said imaging member and wherein said movable mount is operable to adjust said imaging field of view in real time and wherein said optical enhancement module is operable to focus said image data being received by said imaging member between imaging member exposure events.

13. The on-axis guide system as claimed in claim 1, further comprising:

a targeting device comprises a targeting source and a targeting beam splitter;

a targeting light being emitted by said targeting source, wherein said targeting light is reflected by said targeting beam splitter towards said dichroic beam splitter and is then reflected by said dichroic beam splitter towards a reflecting mirror;

said reflecting mirror being located within and coupled to said system body, wherein said reflected mirror is arranged to reflect said targeting light towards said imaging member; and said targeting light being received by said imaging member is a targeting object, wherein said targeting object allows said computing device to locate said guide field of view relative to said imaging field of view.

* * * * *